(12) United States Patent
Goettl

(10) Patent No.: US 9,945,141 B2
(45) Date of Patent: *Apr. 17, 2018

(54) SYSTEMS, METHODS, AND APPARATUSES FOR RELIEVING EXCESSIVE SUCTION WITHIN SWIMMING POOL SKIMMERS

(71) Applicant: GSG Holdings, Inc., Chandler, AZ (US)

(72) Inventor: John M. Goettl, Phoenix, AZ (US)

(73) Assignee: GSG Holdings, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/211,517

(22) Filed: Jul. 15, 2016

(65) Prior Publication Data
US 2016/0326762 A1   Nov. 10, 2016

Related U.S. Application Data

(63) Continuation-in-part of application No. 14/496,107, filed on Sep. 25, 2014, now Pat. No. 9,447,595.

(60) Provisional application No. 61/882,509, filed on Sep. 25, 2013.

(51) Int. Cl.
| | |
|---|---|
| *E04H 4/16* | (2006.01) |
| *B01D 29/23* | (2006.01) |
| *C02F 1/00* | (2006.01) |
| *E04H 4/12* | (2006.01) |
| *B01D 29/25* | (2006.01) |
| *E04H 15/62* | (2006.01) |
| *C02F 103/42* | (2006.01) |

(52) U.S. Cl.
CPC .............. *E04H 4/169* (2013.01); *B01D 29/23* (2013.01); *C02F 1/001* (2013.01); *E04H 4/1272* (2013.01); *E04H 15/62* (2013.01); *B01D 29/25* (2013.01); *C02F 2103/42* (2013.01)

(58) Field of Classification Search
CPC ....... E04H 4/169; E04H 4/1272; E04H 15/62; B01D 29/23; B01D 29/25; C02F 1/001; C02F 2103/42
USPC .......... 210/167.1, 267.19, 416.1, 416.2, 448, 210/167.19
See application file for complete search history.

(56) References Cited

U.S. PATENT DOCUMENTS

| | | | |
|---|---|---|---|
| 4,776,953 A * | 10/1988 | Frentzel | E04H 4/1272 134/167 R |
| 5,830,350 A | 11/1998 | Voss et al. | |
| 6,007,714 A | 12/1999 | Keith | |
| 6,022,481 A | 2/2000 | Blake | |
| 6,962,655 B1 * | 11/2005 | Gjerstad | B01D 29/15 210/167.12 |
| 7,300,576 B1 | 11/2007 | Blake | |
| 7,563,365 B2 | 7/2009 | Pellington et al. | |

(Continued)

*Primary Examiner* — Fred Prince
(74) *Attorney, Agent, or Firm* — Booth Udall Fuller, PLC

(57) ABSTRACT

A pool skimmer basket includes a basket rim, a basket bottom opposite the basket rim, and a lower basket portion. The lower basket portion includes porous sidewalls positioned between the basket rim and the basket bottom. The pool skimmer basket also includes a fluid inlet above a first part of the basket rim, and within a perimeter of the basket rim. The pool skimmer basket also includes a fluid outlet below a second part of the basket rim, and above the basket bottom. The fluid inlet and the fluid outlet are in fluid communication.

22 Claims, 13 Drawing Sheets

(56) References Cited

U.S. PATENT DOCUMENTS

2010/0314328 A1* 12/2010 Bizon .................. E03D 1/30
  210/744

* cited by examiner

SYSTEMS, METHODS, AND APPARATUSES FOR RELIEVING EXCESSIVE SUCTION WITHIN SWIMMING POOL SKIMMERS

CROSS REFERENCE TO RELATED APPLICATIONS

This document is a continuation-in-part of earlier U.S. patent application Ser. No. 14/496,107, entitled "Systems, Methods, and Apparatuses for Relieving Excessive Suction within Swimming Pool Skimmers" to Goettl, which was filed Sep. 25, 2014, now pending, which claims the benefit of the filing date of U.S. Provisional Patent Application 61/882,509, entitled "Systems, Methods, and Apparatuses for Relieving Excessive Suction within Swimming Pool Skimmers" to Goettl which was filed on Sep. 25, 2013, the disclosures of each of which are hereby incorporated by this reference.

BACKGROUND

1. Technical Field

Aspects of this document relate generally to pool skimmer systems.

2. Background Art

Most swimming pools have a skimming device connected to the suction of a pump to draw water from the pool at or very near the pool surface. These devices usually include a basket or strainer to separate larger debris such as leaves and other floating particles. Water drawn from the skimmer can be connected to the suction of a pump that is connected to a typical swimming pool filter system and returned back to the pool in one or more ordinary ways well known in the art. It is common to connect the suction of several pumps to a skimmer in order to enhance skimming action. There are skimmers, commonly called Venturi skimmers, equipped with a pressure jet located to entrain water within the skimmer and eject it back to the pool through a relatively short, unobstructed conduit. This method produces a significant flow increase through the skimmer, resulting in improved surface debris entrapment.

Typically, the pump suction connected to a skimmer is also connected to one or more other drains within the pool. This provides protection to the skimmer basket should it become blocked by debris. The suction is simply diverted to the other drain thereby protecting the skimmer basket from deformation or bursting.

In the case of connecting pump suction to a skimmer only, the basket will usually fail when totally blocked by debris, resulting in the expense and labor of cleaning the system of debris and replacement of the damaged basket. In the case of a Venturi skimmer, when the debris basket becomes blocked, the Venturi return line becomes a point of suction that can be very dangerous to a bather. This is particularly true when the suction of a pump is also connected to a Venturi type skimmer as the flow through the Venturi return is reversed when the basket becomes full or otherwise blocked due to the suction of the separately attached pump.

There are skimming devices that provide air relief in an effort to solve the forgoing problems. U.S. Pat. No. 5,830,350 to Price describes a skimmer basket that has a central perforated pylon extending from the basket bottom to above the basket rim. The pylon consumes a portion of the basket capacity and is difficult to manufacture (e.g. has to be made in multiple pieces, etc.). U.S. Pat. No. 7,300,576 to Blake describes a conventional Venturi skimmer with an external tube running from the upper interior of the main skimmer body to a location below the skimmer basket in the main skimmer body. This method results in a necessarily small tube on the exterior of the skimmer which is very difficult to clean (due to the 90 degree turns involved) and costly to manufacture. Furthermore, the chance of damaging the skimmer during the construction process is increased due to its exterior nature.

Skimmer baskets typically sit below the water level, in a recess that collects pieces of debris found floating in the pool. In addition to the debris typically collected in a skimmer basket from a pool, other undesirable elements that may be found collected in the skimmer basket recess can include insects, snakes, and other unpleasant animals. Many skimmer baskets have handles below the water level, requiring a person to reach their hand into the collected debris, insects, and animals.

SUMMARY

According to one aspect, a pool skimmer basket comprises a basket rim, a basket bottom opposite the basket rim, and a lower basket portion. The lower basket portion comprises one or more continuous porous sidewalls positioned between the basket rim and the basket bottom. The pool skimmer basket also comprises a fluid inlet. The fluid inlet is above at least a first part of the basket rim and within a perimeter of the basket rim. Additionally, the pool skimmer basket comprises a fluid outlet. The fluid outlet is below at least a second part of the basket rim and above the basket bottom. The fluid inlet and the fluid outlet are in fluid communication.

Various implementations and embodiments may comprise one or more of the following elements. The pool skimmer basket may further comprise an upper basket portion. The basket rim may comprise a lower basket rim, an upper basket rim, and two basket side rims extending between the upper basket rim and the lower basket rim. The first part of the basket rim may be the lower basket rim, and the second part of the basket rim may be the upper basket rim.

The upper basket portion may comprise a porous sidewall extending between the lower basket rim and the upper basket rim, as well as a pool inlet opening extending between the lower basket rim and the upper basket rim. The two basket side rims may be positioned adjacent two terminating ends of the porous sidewall of the upper basket portion. The fluid inlet may be an interior surface of the porous sidewall of the upper basket portion, and the fluid outlet may be an exterior surface of the porous sidewall of the upper basket portion. The fluid inlet and the fluid outlet may be in fluid communication through the porous sidewall of the upper basket portion.

The pool skimmer basket may comprise a handle adjacent the upper basket rim. The pool skimmer basket may further comprise an upper rim opening for each of the two basket side rims. The upper rim opening may extend through the upper basket rim. The pool skimmer basket may also comprise a lower rim opening for each of the two basket side rims. The lower rim opening may extend through the lower basket rim. The two basket side rims may be conduits extending through a majority of the two basket side rims, respectively. Furthermore, for each of the two basket side rims, the lower rim opening and the upper rim opening may be in fluid communication through the basket side rim. The lower basket rim may be adjacent the pool inlet opening and may extend only between the two basket side rims.

The pool skimmer basket may comprise one or more air slots extending through the upper basket rim. The one or more air slots may be positioned on the upper basket rim adjacent the porous sidewall of the upper basket portion. The pool skimmer basket may further comprise one or more air slots extending through the lower basket rim. The lower basket rim may extend around the entire pool skimmer basket. The one or more air slots may be positioned on the lower basket rim adjacent the porous sidewall of the upper basket portion.

The pool skimmer basket may further comprise a first conduit adjacent to the basket rim. The first conduit may comprise an upper segment and a lower segment. The upper segment of the first conduit may comprise the fluid inlet, and/or the lower segment of the first conduit may comprise the fluid outlet. The fluid outlet may be outside the one or more continuous porous sidewalls. The fluid inlet and the fluid outlet may be in fluid communication through the first conduit.

The first conduit may pass through the basket rim, and the first conduit may be flush with an outermost edge of the basket rim. Also, the first conduit may pass through the basket rim, and the first conduit may be inside an outermost edge of the basket rim. At least a part of the lower segment of the first conduit may also be a part of the one or more continuous porous sidewalls. The pool skimmer basket may further comprise a handle coupled to the upper segment of the first conduit. The upper segment of the first conduit may form an angle with the lower segment of at least 90 degrees.

The pool skimmer basket may further comprise a first conduit and at least one additional conduit, all adjacent to the basket rim. The pool skimmer basket may also comprise a handle, which may be above the basket rim and/or coupled to the first conduit and/or one or more of the at least one additional conduits. The first conduit may comprise the fluid inlet and the fluid outlet. Also, each of the at least one additional conduits may comprise a secondary fluid inlet and/or a secondary fluid outlet.

The secondary fluid inlet may be above the basket rim and/or within the perimeter of the basket rim, for each of the at least one additional conduits. The secondary fluid outlet may be below the basket rim and above the basket bottom, for each of the at least one additional conduits. The fluid inlet and the fluid outlet may be in fluid communication through the first conduit. The secondary fluid inlet and/or the secondary fluid outlet may be in fluid communication through their respective additional conduit, for each of the at least one additional conduits. Finally, the fluid outlet and/or the secondary fluid outlet of each of the at least one additional conduits may be outside the one or more continuous porous sidewalls.

The first conduit and/or each of the at least one additional conduits may pass through the basket rim, and the first conduit and/or one or more of the at least one additional conduits may be flush with an outermost edge of the basket rim. The first conduit and/or each of the at least one additional conduits may pass through the basket rim, and the first conduit and/or one or more of the at least one additional conduits may be inside an outermost edge of the basket rim. At least a part of the first conduit may also be a part of the one or more continuous porous sidewalls. The first conduit and/or one or more of the at least one additional conduits may be porous. Finally, the handle may be able to at least partially rotate about an axis. The axis may pass through the first conduit and/or one of the at least one additional conduits.

The basket rim may comprise a lower basket rim, an upper basket rim, and two basket side rims extending between the upper basket rim and the lower basket rim. The lower basket rim and upper basket rim may be planar or non-planar with respect to each other, and non-planar with respect to the two basket side rims.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended pool skimmer systems and/or assembly procedures for pool skimmer systems will become apparent for use with implementations of pool skimmer systems from this disclosure. Accordingly, for example, although particular pool skimmer systems are disclosed, such pool skimmer systems and implementing components may comprise any shape, size, style, type, model, version, measurement, concentration, material, quantity, and/or the like as is known in the art for such pool skimmer systems and implementing components, consistent with the intended operation of pool skimmer systems.

Figure 1:
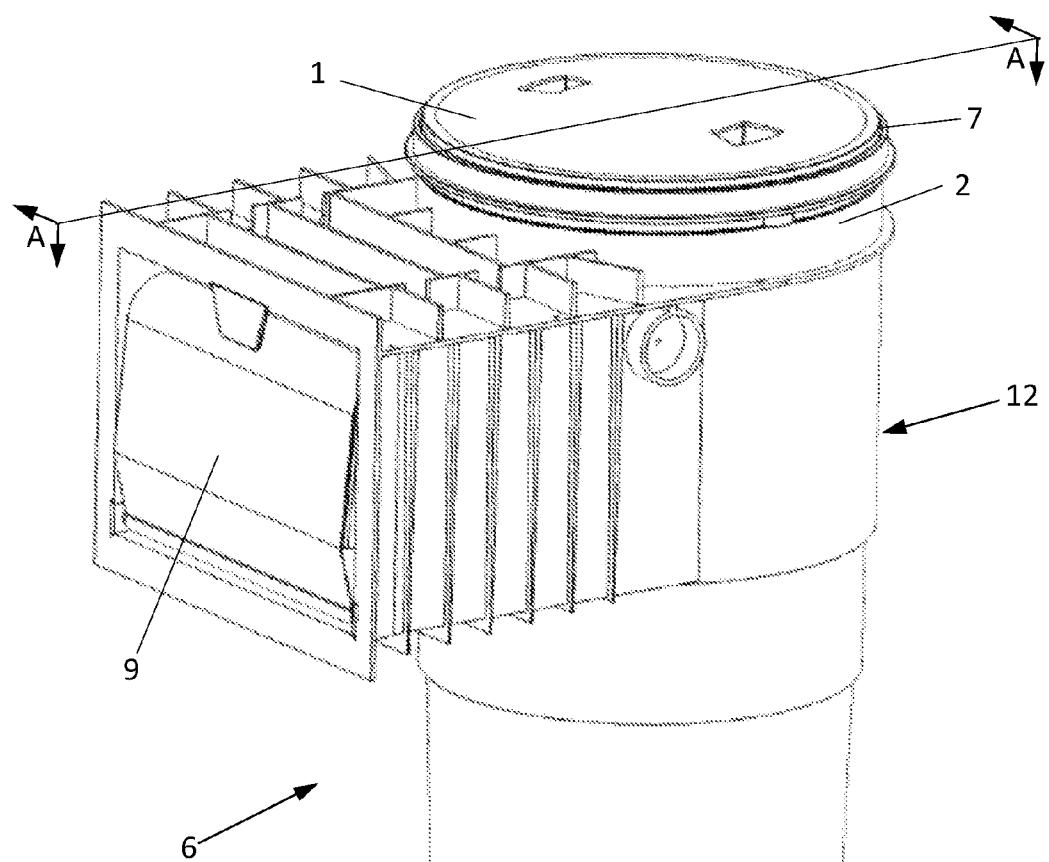
FIG. 1 is a perspective view of a pool skimmer housing.
Figure 1:
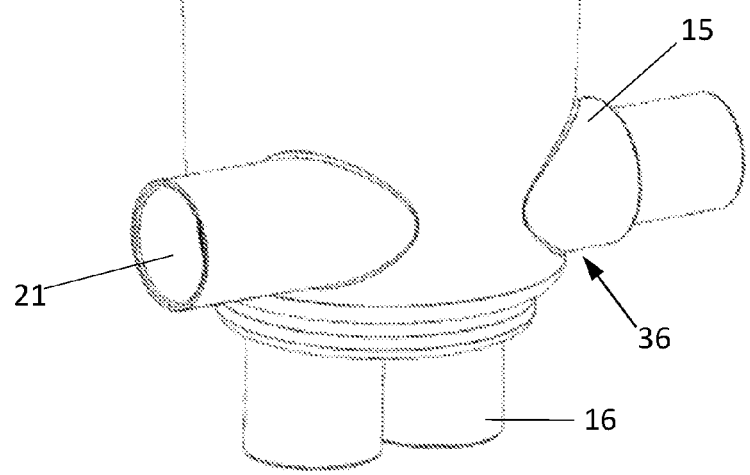

FIG. 1 depicts a non-limiting embodiment of a pool skimmer housing. Reference is made throughout this document to an upper skimmer housing 12 and a lower skimmer housing 11. It is contemplated that the upper skimmer housing 12 and the lower skimmer housing 11 may comprise two separate and individual pieces coupled together, or a single piece integrally formed during manufacture, whether formed as two separate pieces or as one piece, the respective areas of the skimmer housing will be referred to as upper skimmer housing 12 and lower skimmer housing 11. In the particular non-limiting embodiment depicted in FIGS. 1 and 2, the upper skimmer housing 12 and the lower skimmer housing 11 comprise two separate pieces coupled together. It is further contemplated embodiments of a pool skimmer system 6 in general and a pool skimmer housing referenced in this document may comprise various features of a pool skimmer housing previously known in the art, such as but not limited to a pool throat opening 3 having an upper wall 17 and a lower wall 18, a weir 9 hingedly or otherwise pivotally coupled to the upper skimmer housing 12 proximate a pool throat opening 3, a deck closure or cover 1 coupled to the upper skimmer housing 12 proximate a deck throat opening 5, one or more pump suction ports 16 on a bottom 20 of the lower skimmer housing 11, a finish edge 7, a skimmer interior wall 4, a deck ring 2, and the like. In one or more embodiments, the pool surface elevation is approximately ½ of skimmer throat opening, or halfway between the upper wall 17 and the lower wall 18 of the pool throat opening 3. However, the pool elevation can vary from upper elevation at the upper wall 17 to a lower elevation at the lower wall 18 due to increased bather influx, rain, insufficient make up water, and other reasons known in the art. Some skimmer embodiments are adapted with an overflow port 19 to limit and provide an attachment point of piping to carry away overflow to a suitable area away from the pool. Normally, the maximum water containing height of a pool is approximately upper elevation at the upper wall 17.

The skimmer housing may comprise a basket opening positioned within the pool skimmer housing. The basket opening is sized to house a basket 10 and allow a fluid path 31 between the basket 10 and the skimmer interior wall 4, as shall be described in greater detail below. To facilitate housing of the basket 10 within the skimmer housing, the upper skimmer housing 12 comprises a first basket opening 41 and the lower skimmer housing 11 comprises a second basket opening 42 aligned with the first basket opening 41.

Figure 6:
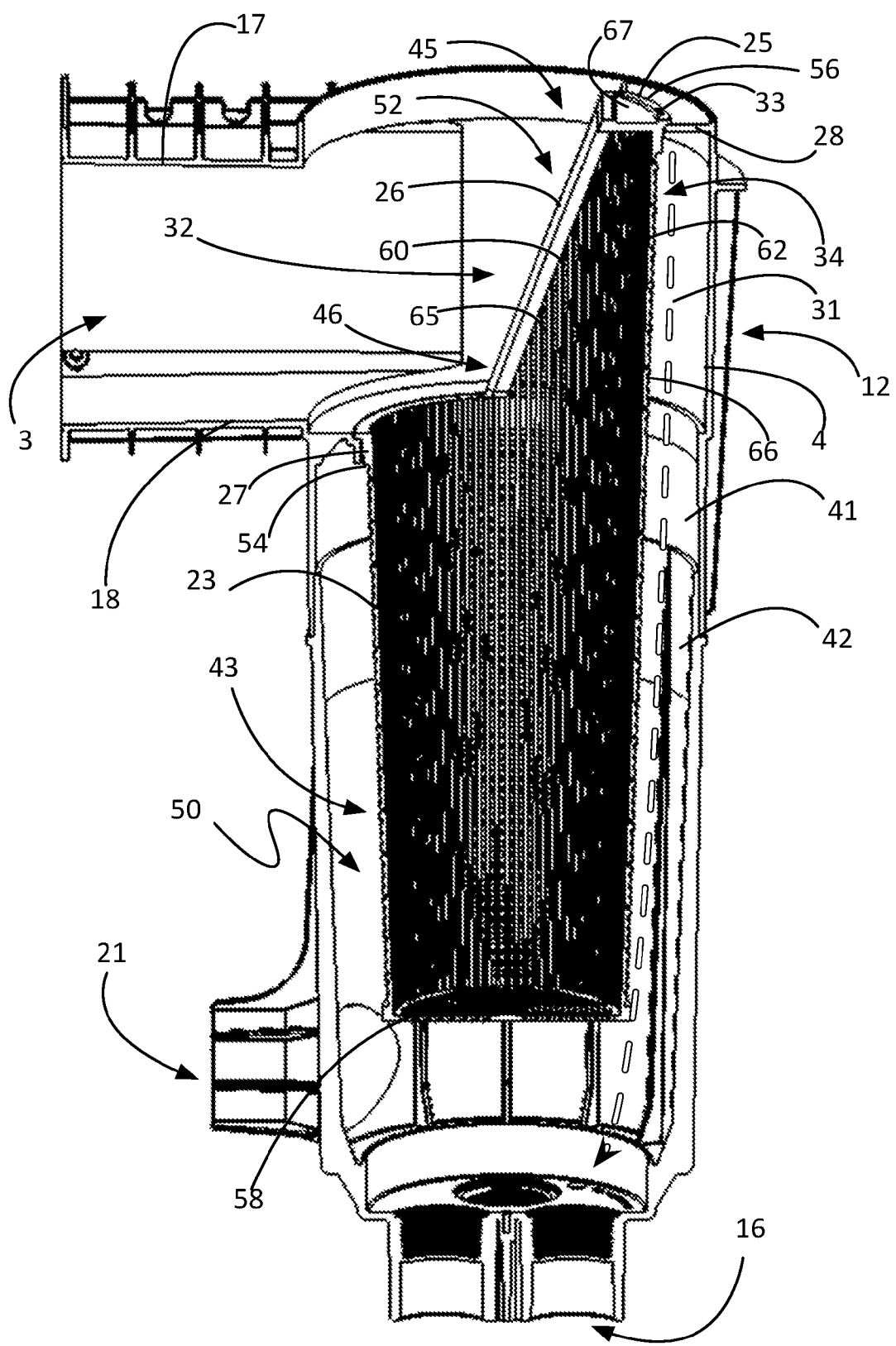
FIG. 6. is a cross-sectional view of a pool skimmer housing and the skimmer basket of FIG. 4.
Figure 9:
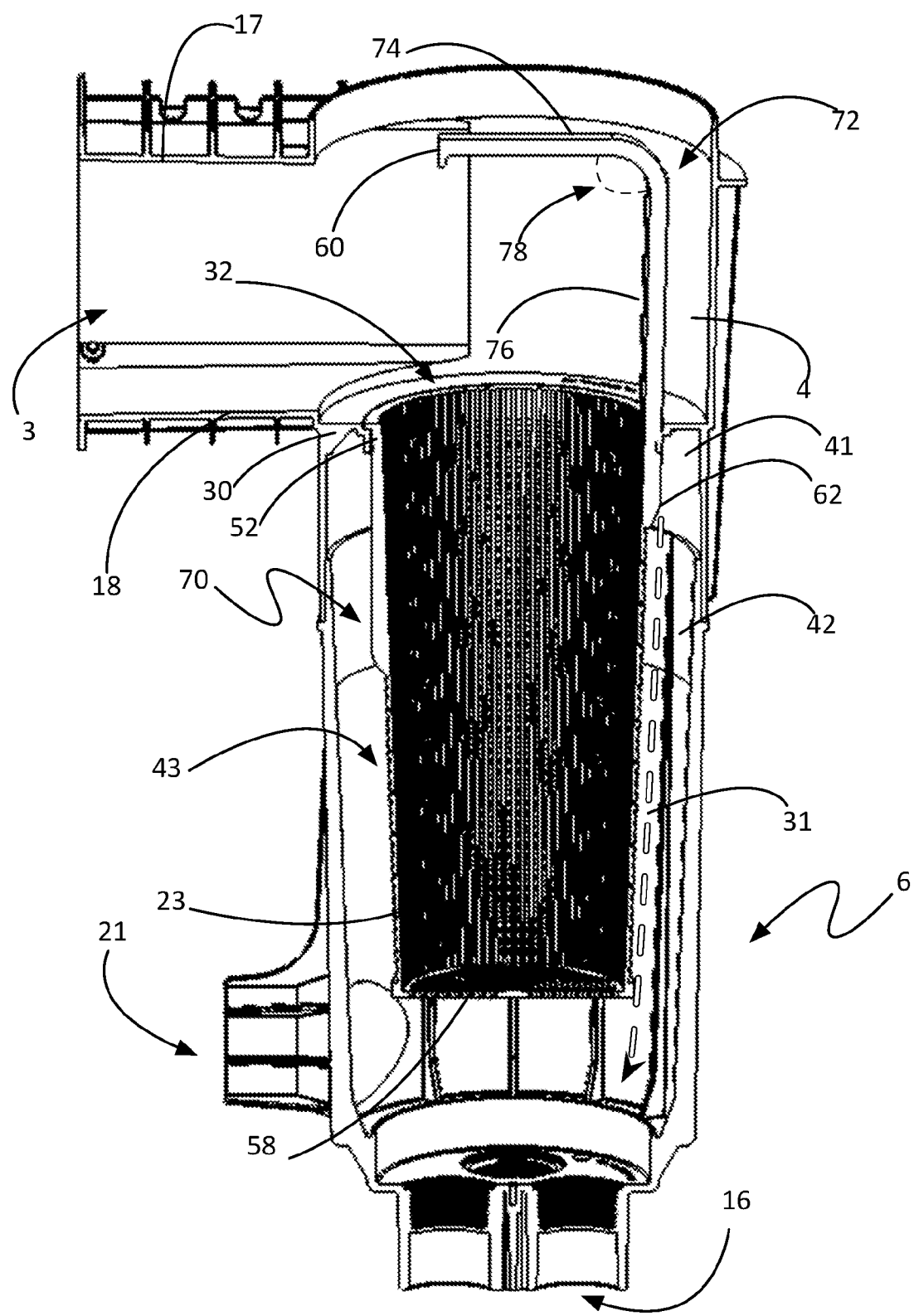
FIG. 9. is a cross-sectional view of a pool skimmer housing and the skimmer basket of FIG. 7.
Figure 12:
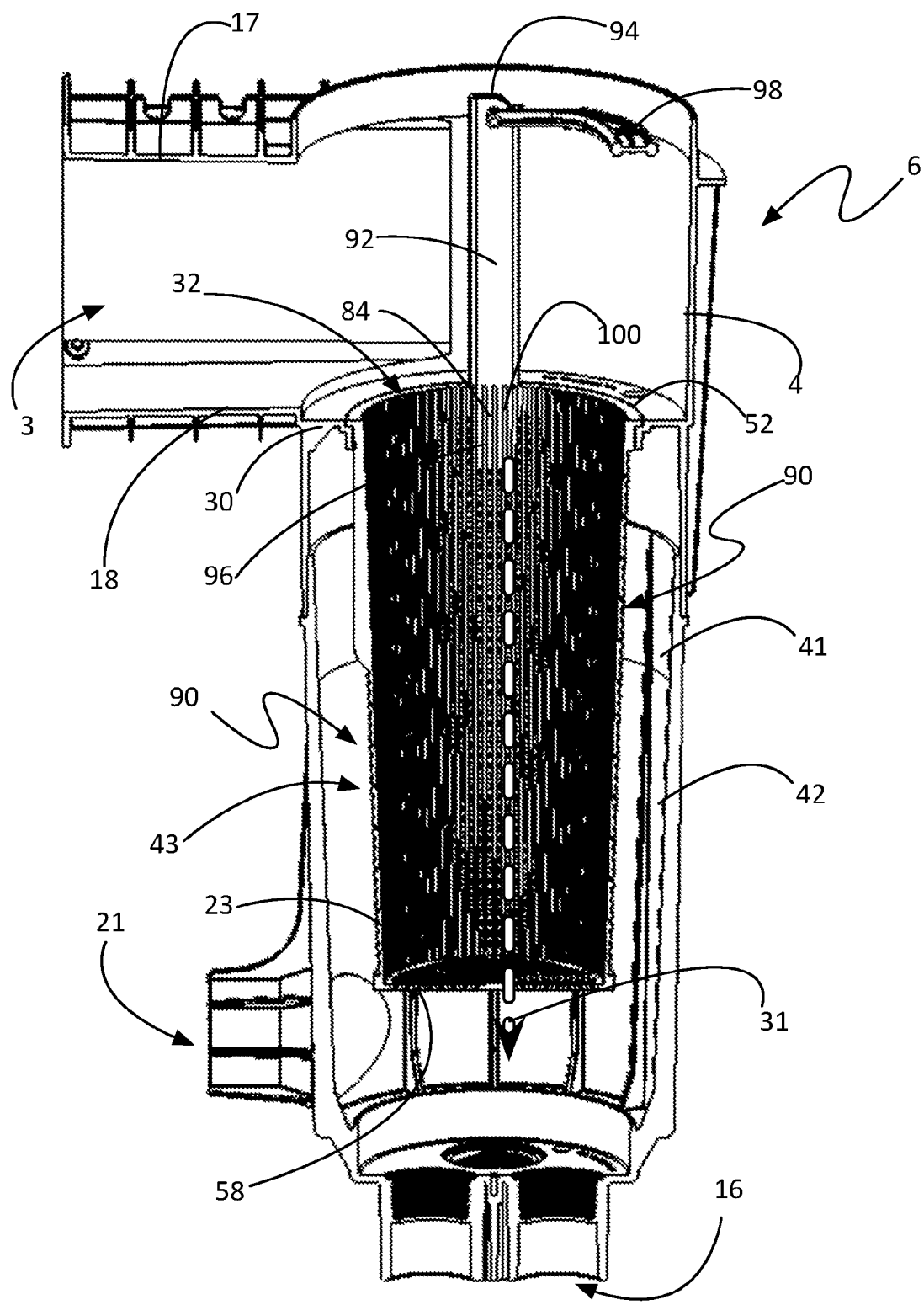
FIG. 12. is a cross-sectional view of a pool skimmer housing and the skimmer basket of FIG. 10.

Additionally, the lower skimmer housing 11 may comprise a venturi system 36. The venturi system typically comprises a pump inlet port 15 having a venturi nozzle 13 coupled thereto and a pool return port 21 having a venturi sleeve 14 coupled thereto. The venturi system 36 may operate as is known to those having ordinary skill in the art. For example, a pool pump associated with the system may pull water in the skimmer housing into the one or more pump suction ports 16 or any other suction ports known in the art, push water into the skimmer housing through the pump inlet port 15, and push water into the pool return port 21 to return filtered water back into the pool and create a high velocity flow to entrain water in the skimmer housing, thereby creating an increased flow through the skimmer. The one or more conventional pump suction ports 16 are configured for connection of additional pump or pump suction and drain connection in the conventional manner. A non-limiting, alternate embodiment of pool skimmer system 6 without a venturi system 36 is depicted in FIGS. 6, 9, and 12.

In one or more embodiments, the pool skimmer housing comprises a lower skimmer rim 30 and an upper skimmer rim 28. The lower skimmer rim 30 is configured to engage with the lower basket rim 27 of the basket 10 when the basket 10 is mounted in the skimmer housing. The lower skimmer rim 30 is positioned proximate the first basket opening 41 in some embodiments. More particularly, the lower skimmer rim 30 may be positioned at an elevation that is similar to or lower than the lower wall 18 of the pool throat opening 3. In the non-limiting embodiment depicted in FIG. 2, the lower skimmer rim 30 is positioned substantially level with the lower wall 18 of the pool throat opening 3, being lowered just enough that the lower basket rim 27 is level with the lower wall 18 of the pool throat opening 3 when the basket 10 is mounted within the skimmer housing. In other embodiments, the lower skimmer rim 30 is positioned below the elevation or level of the lower wall 18 of the pool throat opening 3. According to some aspects, the lower skimmer rim 30 is positioned in a portion of the skimmer interior wall 4 nearest the pool throat opening 3. This positioning prevents the lower skimmer rim 30 from interfering with the fluid path 31 between the air slots 33 and the one or more pump suction ports 16. In other embodiments, however, the lower skimmer rim 30 may be positioned anywhere on the skimmer interior wall 4 so long as a fluid path 31 is not significantly blocked. More particularly, at least a portion of the lower skimmer rim 30 may be positioned on a portion of the skimmer interior wall 4 opposite the pool throat opening 3 in embodiments wherein the lower basket rim 27 comprises one or more air slots 33.

According to some aspects, the upper skimmer rim 28 is positioned on a skimmer interior wall 4 of the upper skimmer housing 12 at an elevation 8 that is at least halfway between the upper wall 17 and the lower wall 18 of the skimmer throat opening 3. The upper skimmer rim 28 is configured to engage with the upper basket rim 25 of the basket 10 when the basket 10 is mounted in the skimmer housing. In the non-limiting embodiment depicted in FIG. 2, the upper skimmer rim 28 is positioned at an elevation that is substantially level with the upper wall 17 of the pool throat opening 3. In this configuration, the upper skimmer rim 28 is positioned proximate the pool deck opening 5 at an elevation wherein the air slots 33 of FIG. 3 will always be above the pool water level. This ensures the safety of the venturi system, as described in greater detail below. The air slots 33, however, are not required in all embodiments to provide some of the advantages described herein.

One or more embodiments of a skimmer housing comprise two skimmer side rims 29 extending at least partially between the upper skimmer rim 28 and the lower skimmer rim 30. The skimmer side rims 29 are configured and positioned within the upper skimmer housing 12 to engage with the basket side rims of the basket 10 to prevent or otherwise inhibit pool water from flowing between the basket 10 and the skimmer side rims 29 when the basket 10 is mounted within the skimmer housing. The skimmer side rims 29 may be substantially vertical or angled complementary to the positioned of the basket side rims 26.

Figure 2:
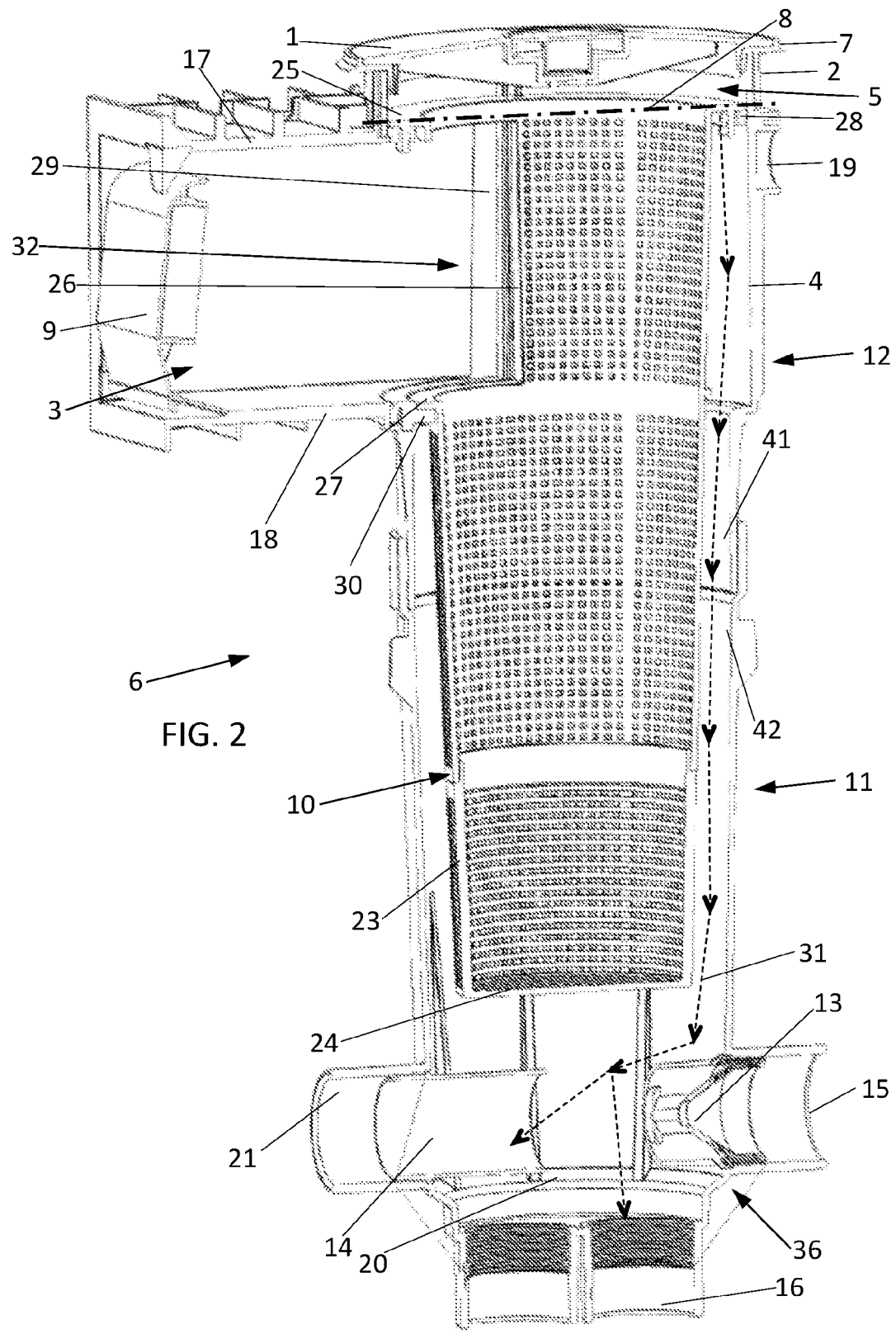
FIG. 2 is a perspective view of a pool skimmer housing and a skimmer basket taken along sectional line A-A of FIG. 1.
Figure 3:
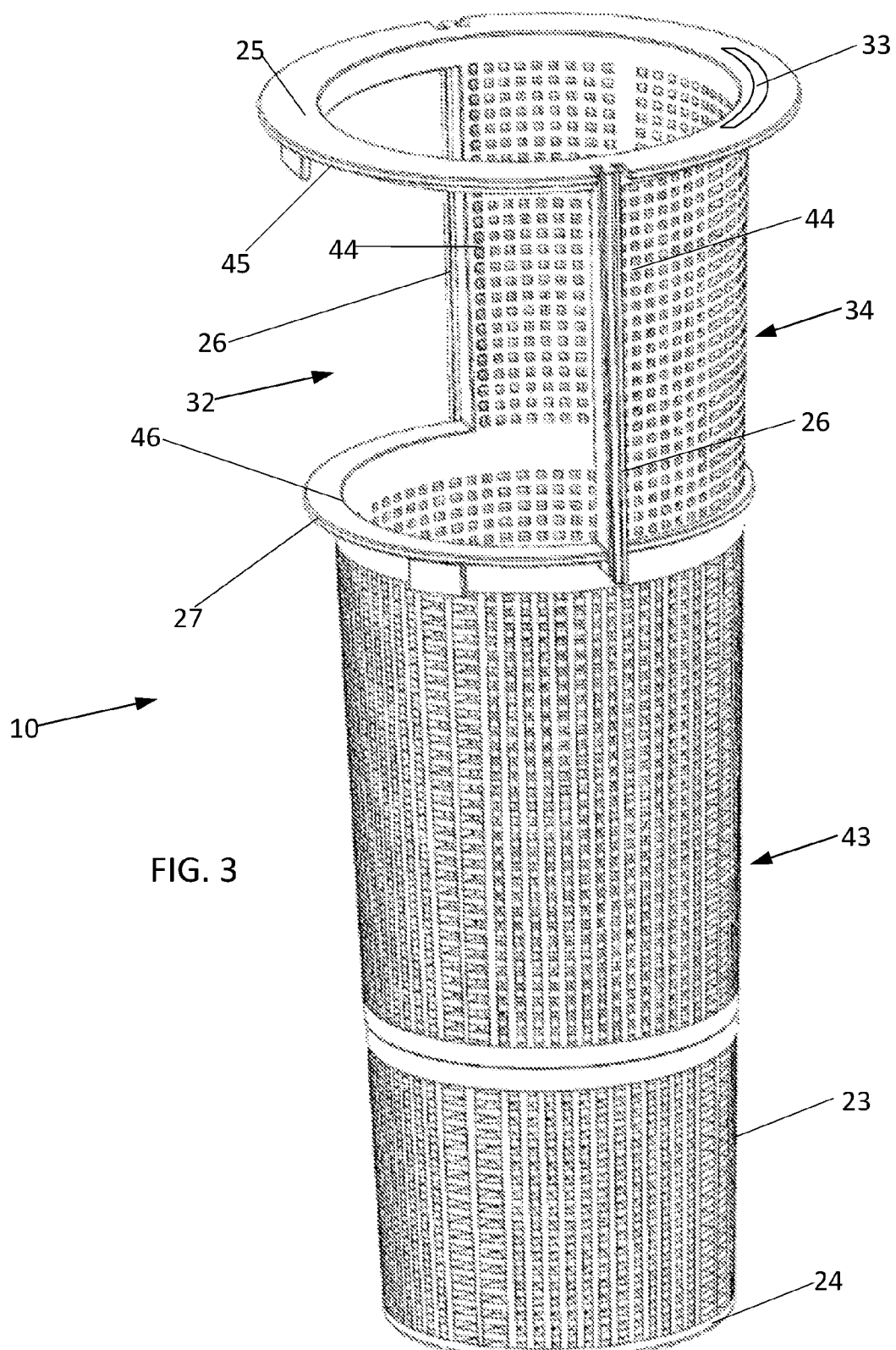
FIG. 3 is a perspective view of a skimmer basket, according to one embodiment.

Also contemplated in this disclosure is a skimmer basket 10 for use in a pool skimmer system 6. The basket 10 is advantageous to conventional skimmer baskets because, in combination with the configuration of the skimmer housing, a fluid path 31 is formed between the porous walls 23 of the basket and the skimmer interior wall 4. FIG. 2 depicts a cross sectional view of a non-limiting embodiment of a basket 10 mounted within a pool skimmer housing and FIG. 3 depicts a non-limiting embodiment of a basket 10. According to some aspects, a basket 10 is sized and shaped to fit within the pool skimmer housing, and may be either a conical or frusto-conical shape, or any other shape that fits within the pool skimmer housing.

Similar to conventional skimmer baskets, a skimmer basket 10 comprises an open top, a porous bottom 24, and one or more porous sidewalls 23, as shown in FIG. 3. In conventional skimmer baskets, however, the porous walls extend continuously from the top of the basket to the bottom of the basket. Embodiments of a pool skimmer basket 10 contemplated in this disclosure comprise a pool inlet opening 32 positioned between the upper basket rim 25 and the porous sidewalls 23. More particularly, one or more embodiments of a basket 10 comprise an upper basket portion 34 extending between an upper basket rim 25 and a lower basket rim 27, and a lower basket portion 43 extending between the lower basket rim 27 and the porous bottom 24 of the basket. In the lower basket portion 43, the one or more porous sidewalls 23 typically extend entirely around the circumference of the basket 10. In the upper basket portion 34, the one or more porous sidewalls 23 extend only partially around the circumference of the basket 10, with a pool inlet opening 32 interrupting the continuity of the porous sidewall 23. The pool inlet opening 32 may be bordered by the upper basket rim 25, the lower basket rim 27, and two basket side rims 26 that extend from the lower basket rim 27 to the upper basket rim 25, in some embodiments. Similarly, the porous wall 23 of the upper basket portion 34 may comprise two terminating ends 44 proximate the two basket side rims 26 and may extend from the upper basket rim 25 to a position level with the lower basket rim 27.

As depicted in FIGS. 2 and 3, upper basket rim 25, lower basket rim 27, and basket side rims 26 are portions of a single, continuous, multi-planar rim. In other embodiments, upper basket rim 25, lower basket rim 27, and/or basket side rims 26 may be separate, individual rims (e.g. non-continuous).

According to some aspects, the basket side rims 26 may be substantially vertical or angled between the lower basket rim 27 and the upper basket rim 25. In the non-limiting embodiment depicted in FIGS. 2 and 3, the basket side rims 26 are substantially vertical. In such embodiments, an upper end 45 of the pool inlet opening 32 and a lower end 46 of the pool inlet opening are substantially equal in the degree of opening. For example, in the non-limiting embodiment depicted in FIGS. 2 and 3, the basket side rims 26 are positioned approximately 180 degrees from another at both the upper end 45 and the lower end 46 of the pool inlet opening 32. In other embodiments, the basket side rims 26 are substantially vertically but positioned more or less than 180 degrees from one another to increase or decrease, respectively, the size of the pool inlet opening 32.

In embodiments wherein the basket side rims 26 are angled, the upper end 45 and lower end 46 of the pool inlet opening are not equal in the degree of opening. For example, the basket side rims 26 may be angled such that the degree of opening on the upper end 45 is greater than the degree of opening on the lower end 46 of the pool inlet opening 32. Alternatively, the basket side rims 26 may be angled such that the degree of opening on the upper end 45 is less than the degree of opening on the lower end 46 of the pool inlet opening 32. Even more particularly, the two basket side rims 26 may be angled such that an upper end 45 of the pool inlet opening 32 is open for at least 180 degrees and a lower end 46 of the pool inlet opening 32 is open for less than 180 degrees. The resulting angle of the two side basket rims 26 may, then, be angled at an angle with respect to the lower wall 18 of the pool throat opening 3 of anywhere between approximately 45 degrees and 90 degrees.

When mounted within the skimmer housing, pool inlet opening 26 of the basket 10 is positioned facing the pool throat opening 3 of the upper skimmer housing 12 in some embodiments, with the porous sidewall 23 of the upper basket portion 34 positioned opposite the pool throat opening 3. In this position, water entering the pool throat opening 3 from the pool flows through the pool inlet opening 32 into the basket 10. Moreover, the basket side rims 26, the lower basket rim 27, and the upper basket rim 25 prevent or inhibit pool water from entering the first basket opening 41 and the second basket opening 42 except through the porous walls 23 of the basket 10. The width of the skimmer throat 3 and a diameter of the basket 10 are ideally and generally equal or approximately equal. They may, however, comprise any dimensional combination. In particular embodiments, the height of pool inlet opening 32 is substantially equal to the distance from the upper skimmer rim 28 to the lower skimmer rim 30. In this way, debris and water will flow into the basket 10 when the pool level is within a range from the upper pool level and the lower pool level.

The lower basket rim 27 of the basket 10 divides the lower basket portion 43 from the upper basket portion 34 in some embodiments and is configured to engage with the lower skimmer rim 30 when the basket 10 is mounted within the skimmer housing (shown in FIG. 2). The lower basket rim 27 may extend only between the basket side rims 26 proximate the pool inlet opening 32 or, alternatively, may extend entirely around the circumference of the basket 10. In embodiments wherein the lower basket rim 27 extends entirely around the circumference of the basket 10, the lower basket rim 27 comprises one or more air slots between the basket side rims 26 and proximate the porous sidewall 23 of the upper basket portion 34.

The upper basket rim 25 of the basket 10 is positioned at or proximate a top of the basket 10 in one or more embodiments and is configured to engage with the upper skimmer rim 28 when the basket 10 is mounted within the skimmer housing (shown in FIG. 2). When positioned within the skimmer housing, the upper basket rim 25 is positioned at an elevation 8 that is at least halfway between the lower wall 18 and the upper wall 17 of the pool throat opening 3. More particularly, when positioned within the housing, the upper basket rim 25 may be positioned above deck throat opening 5 at or above the level of the upper wall 17 of the pool throat opening. The upper basket rim 25 may extend only between the basket side rims 26 opposite the pool inlet opening 32 or, alternatively, may extend entirely around the circumference of the basket 10. In the non-limiting embodiment depicted in FIGS. 2 and 3, the upper basket rim 25 extends entirely around the circumference of the basket 10. The upper basket rim 25 comprises one or more air slots 33 or passages. The one or more air slots 33 are positioned on the upper basket rim 25 such that when the upper basket rim 24 is engaged with the upper skimmer rim 28, the upper skimmer rim 28 does not cover or block the one or more air slots 33. The one or more air slots 33 may be positioned only between the two basket side rims 26 proximate the porous sidewall 23 or, alternatively, around the entirety of the upper basket rim 25.

As depicted in the non-limiting embodiment of FIG. 2, when a basket 10 is mounted within a pool skimmer housing, a fluid path 31 that extends between the one or more pump suction ports 16 and the air slots 33 of the upper basket rim 25 is formed. Air slots 33 are deposed in the upper basket rim 25 in some embodiments to allow atmospheric or fluid communication with fluid path 31, even when pool level is at the upper wall 17 of the pool throat opening 3. Thus, the upper basket rim 25 and a porous wall 23 of the upper portion 34 of the basket 10 is above the normal water level of the pool in one or more embodiments. The normal water level is usually maintained approximately midway between upper wall 17 and lower wall 18 of the pool throat opening 3. As depicted in FIG. 2, the upper basket portion 34 provides additional straining capacity over conventional skimmer devices. The additional porous area added to the basket 10 by the additional area extended to the top of the throat height where the additional basket area only surrounds half of the throat is (D*π*H)/2, where D equals the diameter of the basket 10 and H equals the height of the basket 10 above the lower rim 27 in FIG. 2. For example, in a non-limiting embodiment, a typical skimmer basket 10 may have a diameter of approximately 7.5 inches. Assuming the pool is at a normal water level 8 that is three inches above the lower rim 27, the additional porous area under water would be: (7.5*3.14*3)/2=35.3 sq inches. Furthermore, the additional total porous area, assuming the upper basket portion 34 extends to the top of the skimmer throat opening 3, would be: (7.5*3.14*6)/2=70.7 sq inches. In this way, dangerous over suction is significantly reduced by allowing atmosphere to enter any part of the upper basket portion 34, the air slots 33, or the skimmer throat 3 that are positioned at least partially above the water level of the pool.

It would be understood by those skilled in the art that leaves and other debris being drawn into a pool throat opening 3 from the pool is trapped in the basket 10 and then generally drawn to an inner basket surface. Debris may continue to collect against the inner basket surface until the entire inner basket surface is covered, thus preventing water from flowing through the porous walls 23 and porous bottom 24 of the basket 10 and into the interior flow path. At this point, a vacuum would be created in the skimmer housing by the conventional pump suction port(s) 16 and/or the venturi system 36. The vacuum may be great enough to deform conventional baskets of the prior art. In the case of the pump suction being connected to conventional port(s) 16 and venturi system 36, the flow would be reversed by the pump suction and would cause a dangerous suction condition at pool return port 21.

In contrast to conventional pool skimmer systems, it is apparent with the elements of embodiments of the skimmer that the above described over suction condition is significantly reduced as air is allowed to enter one or more air slots 33 in the upper basket portion 34 above the pool water level. The vacuum in skimmer interior 4 is limited to water depth between the pool return port 21 at the water level, which would normally not exceed 24 inches. As pump suction ports 16 or the venturi system 36 draw water from skimmer housing interior upon activation of the pump suction, air will be drawn into pump suction ports 16 and/or the venturi system 36, thereby causing the suction pump (not shown) to draw in air and ultimately cease suction operation. When pump suction at a pump suction port 16 ceases, any reversing of venturi 36 and the resultant dangerous suction at pool return port 21 will cease, or be limited, to the approximate 24 inch water depth.

It is evident that current invention overcomes the disadvantages by eliminating external tubing and allowing for easier maintenance. It is also apparent that if the basket is not installed the skimmer would employ the same safety features as described. It is apparent that the upper skimmer housing 12 and lower skimmer housing 11 could be adapted to fit only basket 10 of current disclosure to prevent unapproved baskets from being used. The upper rim 25 may also be adapted to form a handle for improved ease of removal of basket 10 for periodic cleaning without submerging hands in debris-filled water as with prior art devices. The additional upper basket portion 34 provides additional straining capacity while providing the safety features previously described.

Figure 4:
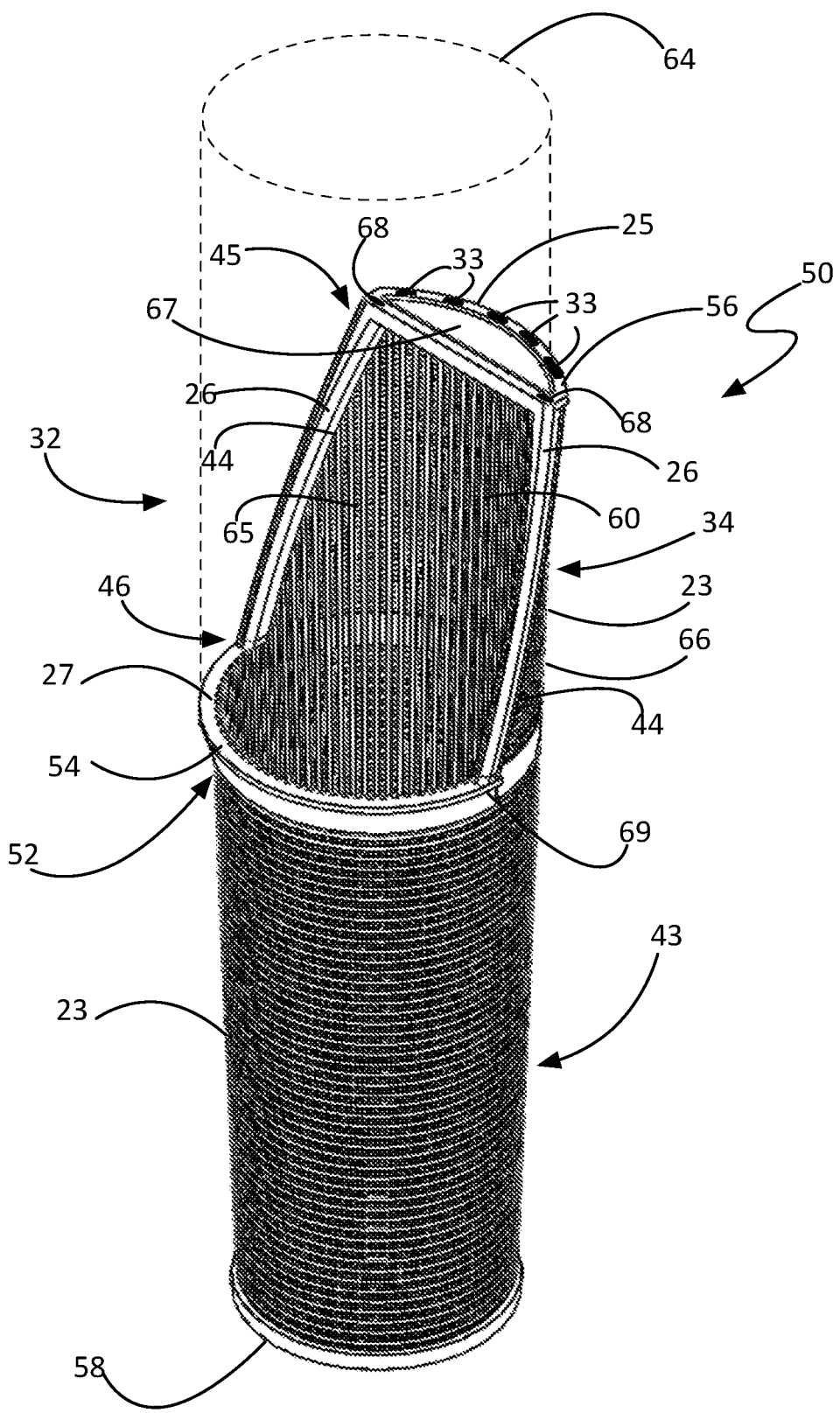
FIG. 4. is a perspective view of another embodiment of a skimmer basket.
Figure 5:
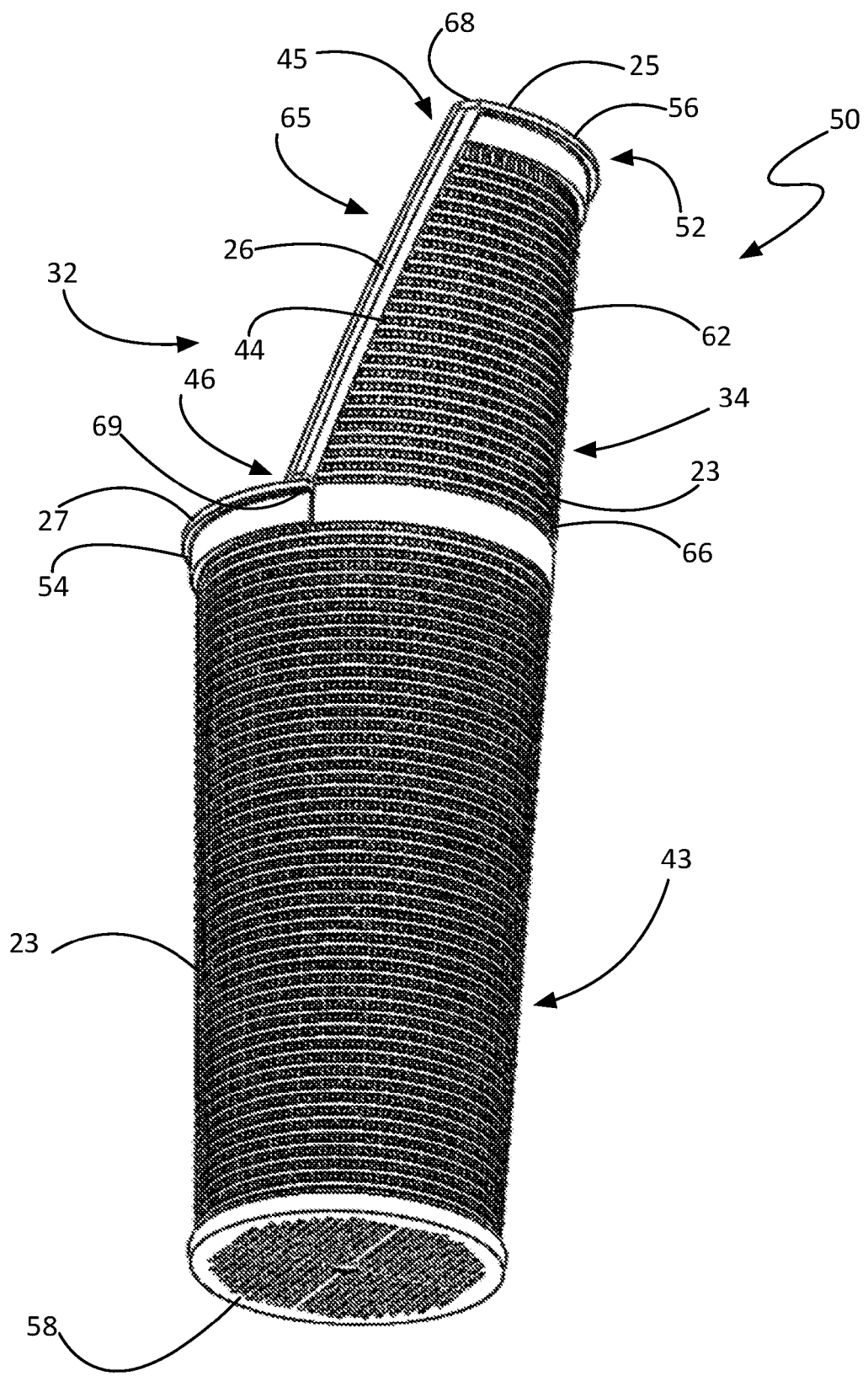
FIG. 5. is an alternative perspective view of the skimmer basket of FIG. 4.
Figure 7:
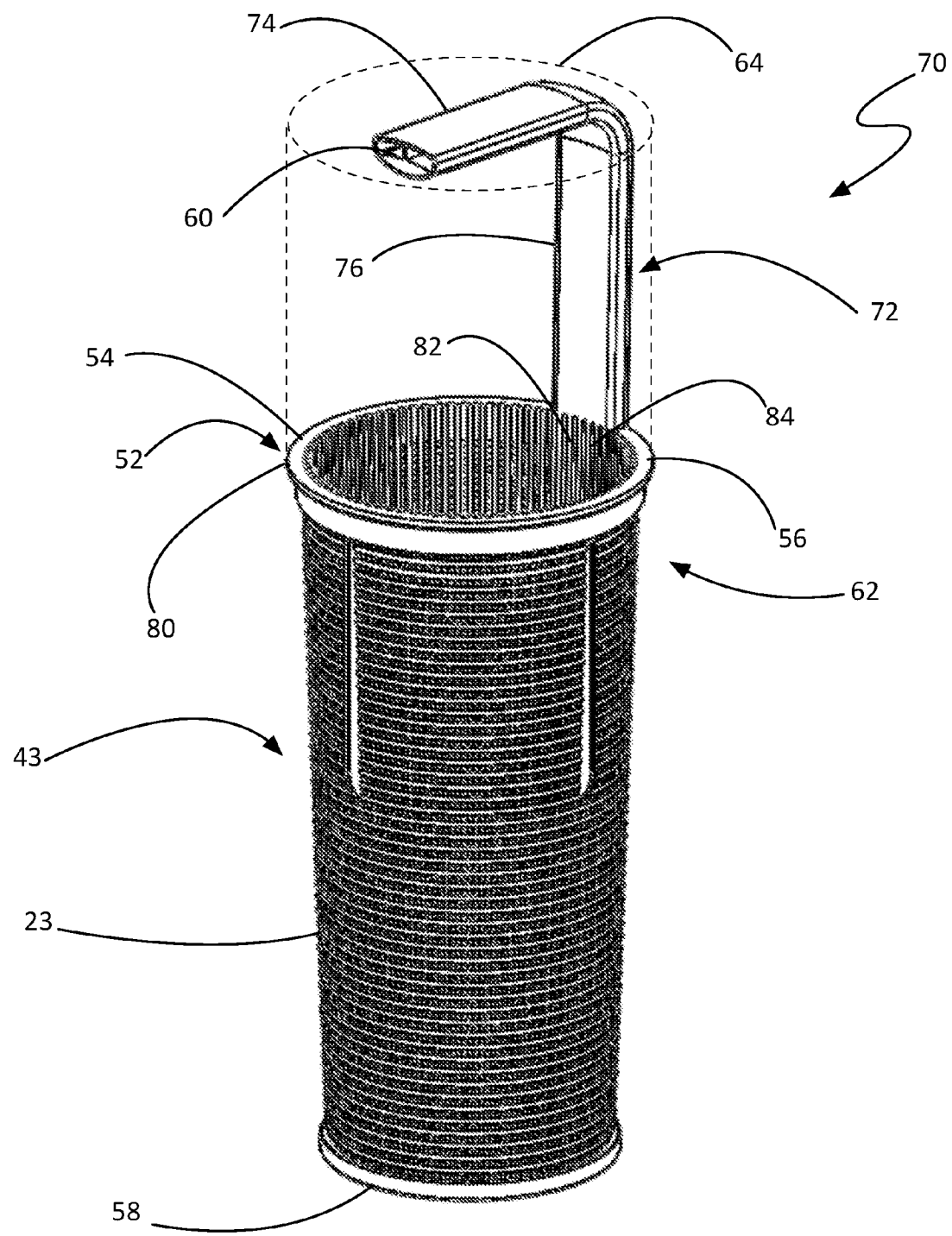
FIG. 7. is a perspective view of another embodiment of a skimmer basket, with a bent conduit.
Figure 10:
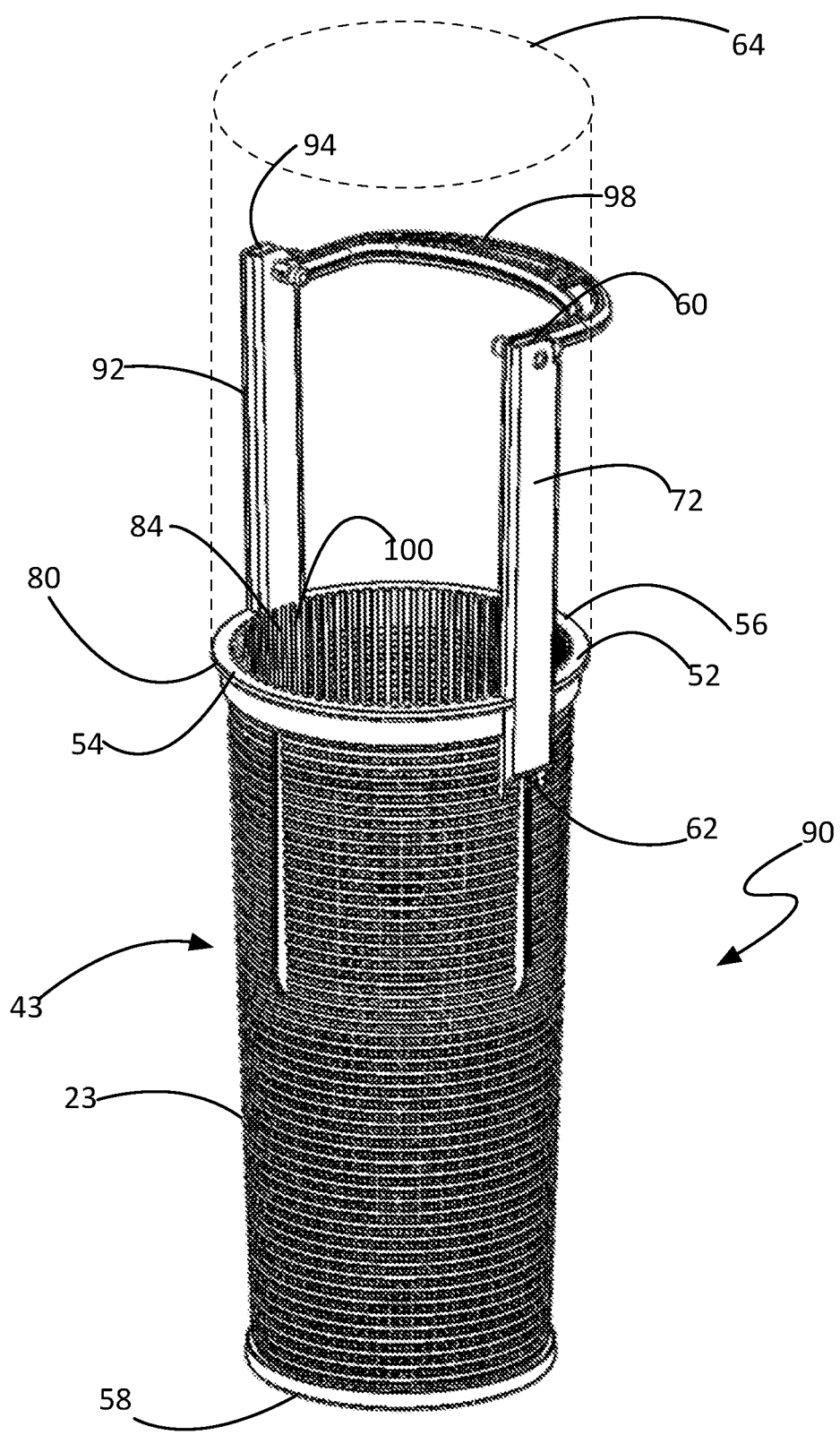
FIG. 10. is a perspective view of another embodiment of a skimmer basket, with two conduits.
Figure 11:
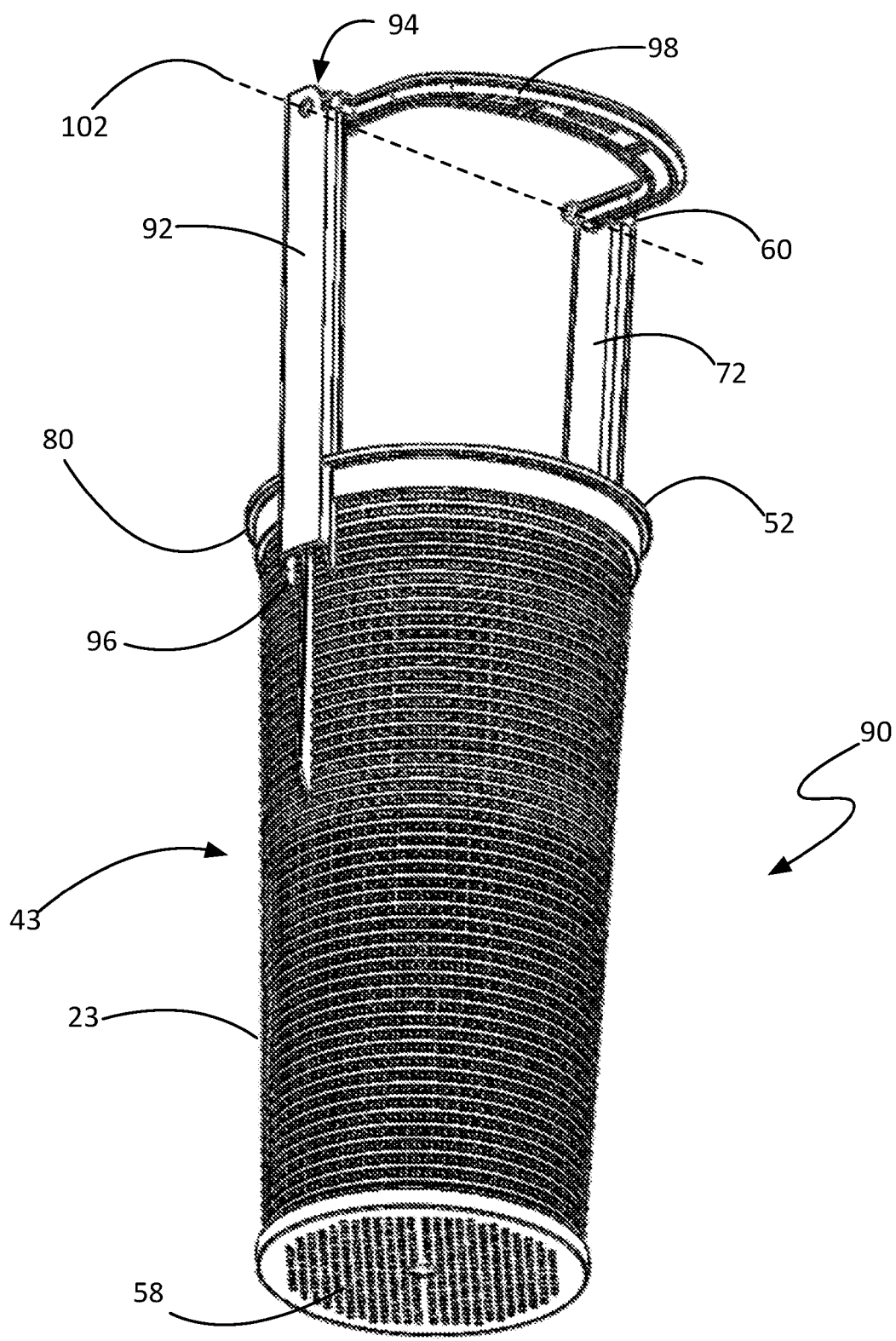
FIG. 11. is an alternative perspective view of the skimmer basket of FIG. 10.

This disclosure further contemplates other embodiments of a pool skimmer basket (e.g. pool skimmer basket 50 of FIGS. 4-6, pool skimmer basket 70 of FIGS. 7-9, pool skimmer basket 90 of FIGS. 10-12, etc.). Each of the embodiments comprise a basket rim. Basket rim 52 comprises a first part 54 and a second part 56 and may be planar, multi-planar (e.g. made up of multiple planes, etc.) or non-planar. These embodiments of the pool skimmer basket further comprise a basket bottom (e.g. porous basket bottom 24, basket bottom 58, etc.), and a lower basket portion (e.g. lower basket portion 43, etc.). As an option, these embodiments may be self-aligning, and do not require extra indexing.

Like basket 10, these additional pool skimmer basket embodiments are advantageous to conventional skimmer baskets because, in combination with the configuration of the skimmer housing, a fluid path 31 is formed between the basket and the skimmer interior wall 4. As illustrated in FIGS. 4-12, before passing between the basket and the skimmer interior wall 4, fluid path 31 passes through, at least, a fluid inlet 60 and a fluid outlet 62, which are in fluid communication with each other. Fluid inlet 60, 94 (FIGS. 4, 7, 10) is above the first part 54 of the basket rim 52, and within the perimeter 64 (FIGS. 4, 7, 10) of the pool skimmer basket. Fluid inlet 60, 94 (FIGS. 6, 9, 12) is also above the normal pool water level (e.g. halfway between upper wall 17 and lower wall 18, etc.) and in some embodiments (e.g. FIG. 2) may be above the maximum pool water level (e.g. upper wall 17). Fluid outlet 62, 96 (FIGS. 5, 7, 8A, 8B, 10) is below the second part 56 of the basket rim 52, and above the basket bottom 58.

As depicted in FIGS. 4-12, basket bottom 58 is porous and planar, like previous depictions of porous bottom 24. In other embodiments, however, basket bottom 58 may be non-porous. Furthermore, basket bottom 58 may be non-planar. For example, in one embodiment, basket bottom 58 may be a spherical cap, including a hemisphere. In other embodiments, basket bottom 58 may take on other shapes, comprising one or more faces. The faces may be continuous porous walls, or may be non-porous.

In some embodiments, such as those illustrated in FIGS. 4-12, the porous sidewalls 23 may be distinct from the basket bottom 58 (e.g. the two elements meet at an angle, etc.). In other embodiments, the transition from porous sidewall 23 to basket bottom 58 may be seamless (e.g. the two elements smoothly transition from one to the other, etc.). As an option, porous sidewalls 23 may take on shapes other than the curved plane depicted in FIGS. 4-12.

Furthermore, as depicted in FIGS. 6, 9, and 12, various embodiments of the pool skimmer basket (e.g. pool skimmer basket 50, 70, 90, etc.) can be suspended in a skimmer housing 12. As shown, at least a portion of pool inlet opening 32 is below the normal pool water level (e.g. halfway between upper wall 17 and lower wall 18, etc.) or at the minimum water level (e.g. lower wall 18, etc.).

This disclosure contemplates a variation on basket 10, pool skimmer basket 50 (FIGS. 4-6), according to various embodiments. Pool skimmer basket 50 may be used in pool skimmer systems that include a venturi system 36 (e.g. pool skimmer system 6 of FIGS. 1 and 2, etc.), as well as pool skimmer systems without a venturi system 36 (e.g. pool skimmer system 6 of FIG. 6., etc.). Like basket 10, pool skimmer basket 50 is advantageous to conventional skimmer baskets because, in combination with the configuration of the skimmer housing, a fluid path 31 is formed between the porous walls 23 of the basket and the skimmer interior wall 4. FIGS. 4 and 5 depict perspective views of a non-limiting embodiment of a pool skimmer basket 50. FIG. 6 depicts a cross-sectional view of a non-limiting embodiment of a pool skimmer basket 50 mounted within a pool skimmer housing. According to some aspects, a pool skimmer basket 50 is sized and shaped to fit within the pool skimmer housing, and may be either a conical or frusto-conical shape, or any other shape that fits within a particular pool skimmer housing.

The basket rim 52 of pool skimmer basket 50 comprises a lower basket rim 27, and upper basket rim 25, as well as two basket side rims 26. As illustrated in FIGS. 4-6, upper basket rim 25, lower basket rim 27, and basket side rims 26 are portions of basket rim 52 of pool skimmer basket 50. As depicted, basket rim 52 of pool skimmer basket 50 is a single, continuous, multi-planar rim. In other embodiments, upper basket rim 25, lower basket rim 27, and/or basket side rims 26 may be individual rims (e.g. manufactured as separate pieces, non-continuous, etc.).

The lower basket rim 27 of pool skimmer basket 50 is also the first part 54 of the basket rim 52, and the upper basket rim 25 of pool skimmer basket 50 is also the second part 56 of the basket rim 52.

Similar to conventional skimmer baskets and basket 10, pool skimmer basket 50 comprises an open top, a basket bottom 58, and one or more porous sidewalls 23. In conventional skimmer baskets, however, the porous walls extend continuously from the top of the basket to the bottom of the basket. Advantageously, one or more embodiments of a pool skimmer basket 50 contemplated in this disclosure comprise a pool inlet opening 32 positioned between the upper basket rim 25 and the porous sidewalls 23. More particularly, one or more embodiments of a pool skimmer basket 50 comprise an upper basket portion 34 extending between an upper basket rim 25 and a lower basket rim 27, and a lower basket portion 43 extending between the lower basket rim 27 and the basket bottom 58.

The embodiment of pool skimmer basket 50 shown in FIGS. 4-6 is cylindrical or frusto-conical in shape. In other embodiments, pool skimmer basket 50 may take on other shapes, such as an n-gonal prism, or other polyhedron. As with the cylindrical shaped baskets, these shapes may also be conical or fusto-conical. The variety of pool skimmer basket shapes possible is true with any embodiment shown, described or contemplated in this disclosure and cylindrical or frusto-conically shaped pool skimmer baskets are only used for convenience of explanation.

In the lower basket portion 43, one or more continuous sidewalls 23 typically extend entirely around the perimeter of the pool skimmer basket 50, or may be interrupted occasionally by thin reinforcing fins or structural supports. In the upper basket portion 34, the one or more porous sidewalls 23 extend only partially around the perimeter of the pool skimmer basket 50, with a pool inlet opening 32 interrupting the continuity of the porous sidewall 23. For the particular implementation illustrated in FIG. 5, the pool inlet opening 32 is bordered by the upper basket rim 25, the lower basket rim 27, and two basket side rims 26 that extend from the lower basket rim 27 to the upper basket rim 25. Similarly, the porous wall 23 of the upper basket portion 34 comprises two terminating ends 44 proximate the two basket side rims 26 and extends from the upper basket rim 25 to a position level with the lower basket rim 27.

According to some aspects, the basket side rims 26 may be substantially vertical or angled between the lower basket rim 27 and the upper basket rim 25. In the non-limiting embodiment depicted in FIGS. 4, 5, and 6, the basket side rims 26 are angled. In such embodiments, an upper end 45 of the pool inlet opening 32 and a lower end 46 of the pool inlet opening are not equal in the degree of opening. For example, in the non-limiting embodiment depicted in FIGS. 4, 5, and 6, the basket side rims 26 are angled such that the degree of opening on the upper end 45 is greater than the degree of opening on the lower end 46 of the pool inlet opening 32. Specifically, the degree of opening on the lower end 46 is approximately 180 degrees, while the degree of opening on the upper end 45 is greater than 180 degrees. In other embodiments, the degree of opening on the lower end 56 may be less than 180 degrees.

Alternatively, the basket side rims 26 may be angled such that the degree of opening on the upper end 45 is less than the degree of opening on the lower end 46 of the pool inlet opening 32. Even more particularly, the two basket side rims 26 may be angled such that an upper end 45 of the pool inlet opening 32 is open for at least 180 degrees and a lower end 46 of the pool inlet opening 32 is open for more than 180 degrees. The resulting angle of the two side basket rims 26 may, then, be angled at an angle with respect to the lower wall 18 of the pool throat opening 3 of anywhere between approximately 45 degrees and 90 degrees. In other embodiments, the degree of opening on the upper end 45 may be less than 180 degrees while the lower end 46 is open to a greater degree.

In embodiments wherein the basket side rims 26 are substantially vertical, the upper end 45 and the lower end 46 of the pool inlet opening are substantially equal in the degree of opening. For example, the basket side rims 26 may be positioned approximately 180 degrees from each other at both the upper end 45 and the lower end 46 of the pool inlet opening 32. In other embodiments, the basket side rims 26 are substantially vertical but positioned more or less than 180 degrees from one another to increase or decrease, respectively, the size of the pool inlet opening 32.

In various embodiments, such as that illustrated in FIGS. 4-6, the pool skimmer basket 50 further comprises an upper rim opening 68 and a lower rim opening 69 for each of the two basket side rims 26. The upper rim opening 68 may extend through the upper basket rim 25, and the lower rim opening 69 may extend through the lower basket rim 43. Furthermore, the two basket side rims 26 may be conduits. In the context of the present description, a conduit may be any channel through which a fluid (e.g. water, atmosphere, etc.) may be conveyed. According to some embodiments, for each of the two basket side rims 26, the lower rim opening 69 and the upper rim opening 68 are in fluid communication through their associated side basket rim 26 and their associated basket side rim 26. In this way, the fluid path 31 may be facilitated between the pump suction ports 16 and the upper openings 54, even if the basket below the water line becomes completely blocked by collected debris.

The upper rim 25 may also be adapted to form a handle 67 above the normal pool water level, for improved ease of removal of pool skimmer basket 50 for periodic cleaning without submerging hands in debris-filled water as with prior art devices. By example only, in some embodiments, handle 67 may be a solid surface connecting the upper ends of the basket side rims 26 along the upper basket rim 25. In other embodiments, handle 67 may be a handgrip bridging the upper ends of the basket side rims 26 or any other two separate portions of the upper basket rim 25.

When mounted within the skimmer housing, pool inlet opening 32 of the pool skimmer basket 50 is positioned facing the pool throat opening 3 of the upper skimmer housing 12 in some embodiments, with the porous sidewall 23 of the upper basket portion 34 positioned opposite the pool throat opening 3. In this position, water entering the pool throat opening 3 from the pool flows through the pool inlet opening 32 into the pool skimmer basket 50. Moreover, the basket side rims 26, the lower basket rim 27, and the upper basket rim 25 prevent or inhibit pool water from entering the first basket opening 41 and the second basket opening 42 except through the porous walls 23 of the pool skimmer basket 50. The width of the skimmer throat 3 and a diameter of the pool skimmer basket 50 are ideally and generally equal or approximately equal. They may, however, comprise any dimensional combination. In particular embodiments, the height of pool inlet opening 32 is substantially equal to the distance from the upper skimmer rim 28 to the lower skimmer rim 30. In this way, debris and water will flow into the pool skimmer basket 50 when the pool level is within a range from the upper pool level and the lower pool level.

The lower basket rim 27 of the pool skimmer basket 50 divides the lower basket portion 43 from the upper basket portion 34 in some embodiments and is configured to engage with the lower skimmer rim 30 when the pool skimmer basket 50 is mounted within the skimmer housing (shown in FIG. 6). The lower basket rim 27 may extend only between the basket side rims 26 proximate the pool inlet opening 32 or, alternatively, may extend entirely around the perimeter of the pool skimmer basket 50. In embodiments wherein the lower basket rim 27 extends entirely around the perimeter of the pool skimmer basket 50, the lower basket rim 27 comprises one or more air slots between the basket side rims 26 and proximate the porous sidewall 23 of the upper basket portion 34.

The upper basket rim 25 of the pool skimmer basket 50 is positioned at or proximate a top of the pool skimmer basket 50 in one or more embodiments and is configured to engage with the upper skimmer rim 28 when the pool skimmer basket 50 is mounted within the skimmer housing (shown in FIG. 6). When positioned within the skimmer housing, the upper basket rim 25 is positioned at an elevation that is at least halfway between the lower wall 18 and the upper wall 17 of the pool throat opening 3. More particularly, when positioned within the housing, the upper basket rim 25 may be positioned at or above the level of the upper wall 17 of the pool throat opening. The upper basket rim 25 may extend only between the basket side rims 26 opposite the pool inlet opening 32 or, alternatively, may extend entirely around the perimeter of the pool skimmer basket 50.

In the non-limiting embodiment depicted in FIGS. 4, 5, and 6, the upper basket rim 25 extends only between the basket side rims 26 opposite the pool inlet opening 32. The upper basket rim 25 may comprise one or more air slots 33 or passages, according to various embodiments. The one or more air slots 33 are positioned on the upper basket rim 25 such that when the upper basket rim 25 is engaged with the upper skimmer rim 28, the upper skimmer rim 28 does not cover or block the one or more air slots 33. The one or more air slots 33 may be positioned only between the two basket side rims 26 proximate the porous sidewall 23 or, alternatively, around the entirety of the upper basket rim 25.

Furthermore, in the non-limiting embodiment depicted in FIGS. 4-6, the fluid inlet 60 is an interior surface 65 of the porous sidewall 23 of the upper basket portion 34. Also, the fluid outlet 62 is an exterior surface 66 of the porous sidewall 23 of the upper basket portion 34. The fluid inlet 60 and the fluid outlet 62 are in fluid communication through the porous sidewall 23 of the upper basket portion 34, allowing the formation of fluid path 31, as discussed further below.

As depicted in the non-limiting embodiment of FIG. 6, when a pool skimmer basket 50 is mounted within a pool skimmer housing, a fluid path 31 that extends between the one or more pump suction ports 16 and the porous sidewall 23 of the upper basket portion 34, as well as the air slots 33 of the upper basket rim 25 is formed. Optional air slots 33 are disposed in the upper basket rim 25 in some embodiments to allow atmospheric or fluid communication with fluid path 31, even when pool level is at the upper wall 17 of the pool throat opening 3. Thus, the upper basket rim 25 and a porous wall 23 of the upper portion 34 of the pool skimmer basket 50 are above the normal water level of the pool in one or more embodiments. The normal water level is usually maintained approximately midway between upper wall 17 and lower wall 18 of the pool throat opening 3. In this way, the likelihood of dangerous over suction is reduced by allowing atmosphere to enter any part of the upper basket portion 34, the air slots 33, or the skimmer throat 3 that are positioned at least partially above the water level of the pool, even when the pool skimmer basket 50 is full of debris.

It will be understood by those skilled in the art that leaves and other debris being drawn into a pool throat opening 3 from the pool are trapped in the pool skimmer basket 50 and then generally drawn to an inner basket surface. Debris may continue to collect against the inner basket surface until the inner basket surface is covered up to the upper level of the water, thus preventing water from flowing through the porous walls 23 and basket bottom 24 of the pool skimmer basket 50 and into the interior flow path. At this point, a vacuum would be created in the skimmer housing by the conventional pump suction port(s) 16 and/or a venturi system 36. The vacuum may be great enough to deform conventional baskets of the prior art. In the case of the pump suction being connected to conventional port(s) 16 and a venturi system 36, the flow would be reversed by pump suction and would cause a dangerous suction condition at pool return port 21.

In contrast to conventional pool skimmer systems, it is apparent with the elements of embodiments of skimmers disclosed herein that the likelihood of the above described over suction condition occurring is significantly reduced. Air is allowed to enter one or more air slots 33 in the upper basket portion 34 above the pool water level through parts of the porous sidewall 23 of the upper basket portion 34 (e.g. fluid inlet 60, etc.) which are not covered (e.g. parts above water, etc.) and/or through the upper rim opening 68 for each of the basket side rims 26 which are also conduits, according to various embodiments. The vacuum in the skimmer interior 4 is limited to being caused by the water depth between the pool return port 21 and the water level, which would normally not exceed 24 inches. As pump suction ports 16 or a venturi system 36 draw water from the skimmer housing interior upon activation of the pump suction, air will be drawn into pump suction ports 16 and/or a venturi system 36, thereby causing the suction pump (not shown) to draw in air and ultimately cease suction operation. When pump suction at a pump suction port 16 ceases, any reversing and the resultant dangerous suction at pool return port 21 will cease, or be limited to the approximate 24 inch water depth.

Figure 8A:
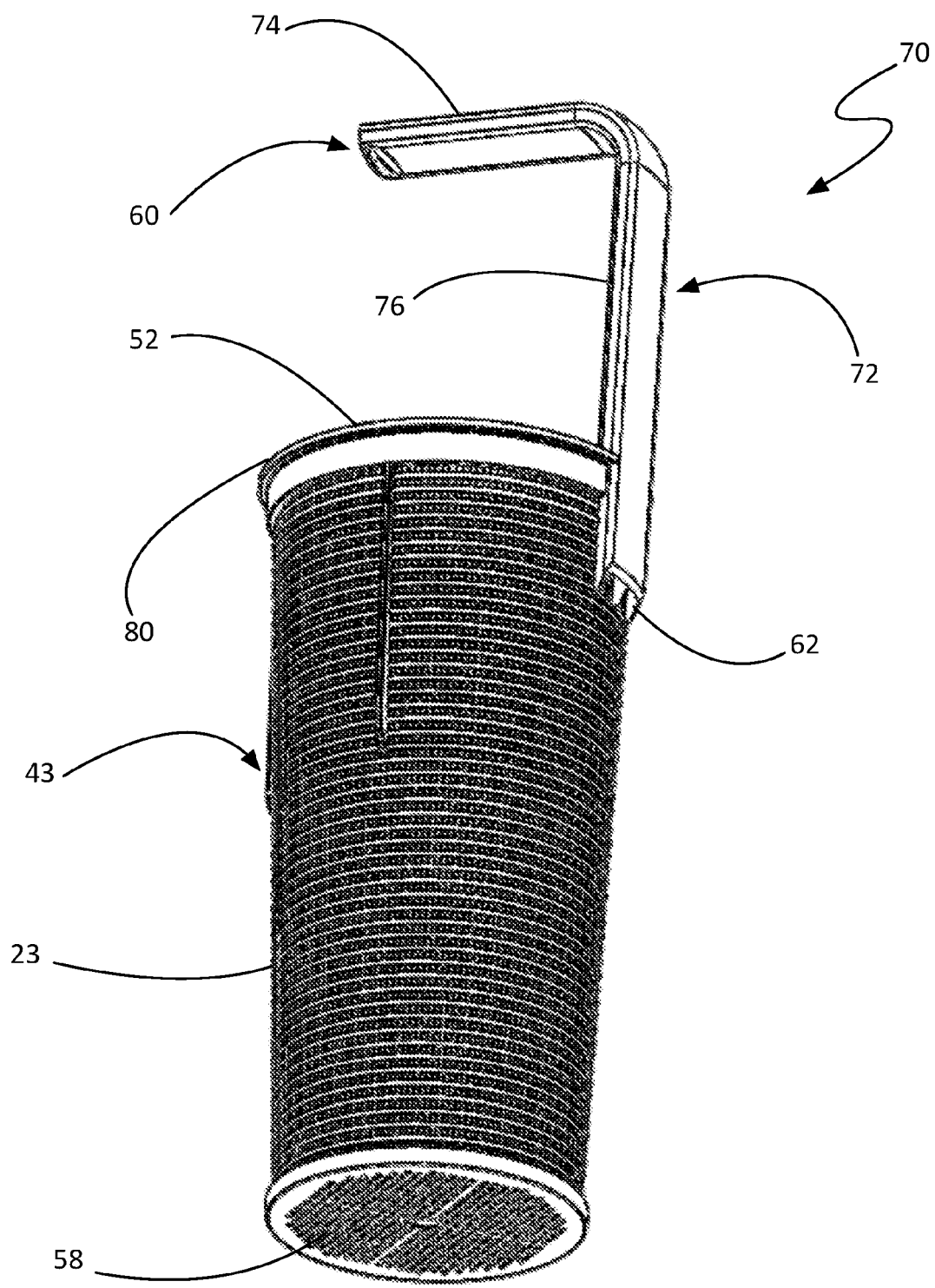
FIG. 8A. is an alternative perspective view of the skimmer basket of FIG. 7.
Figure 8B:
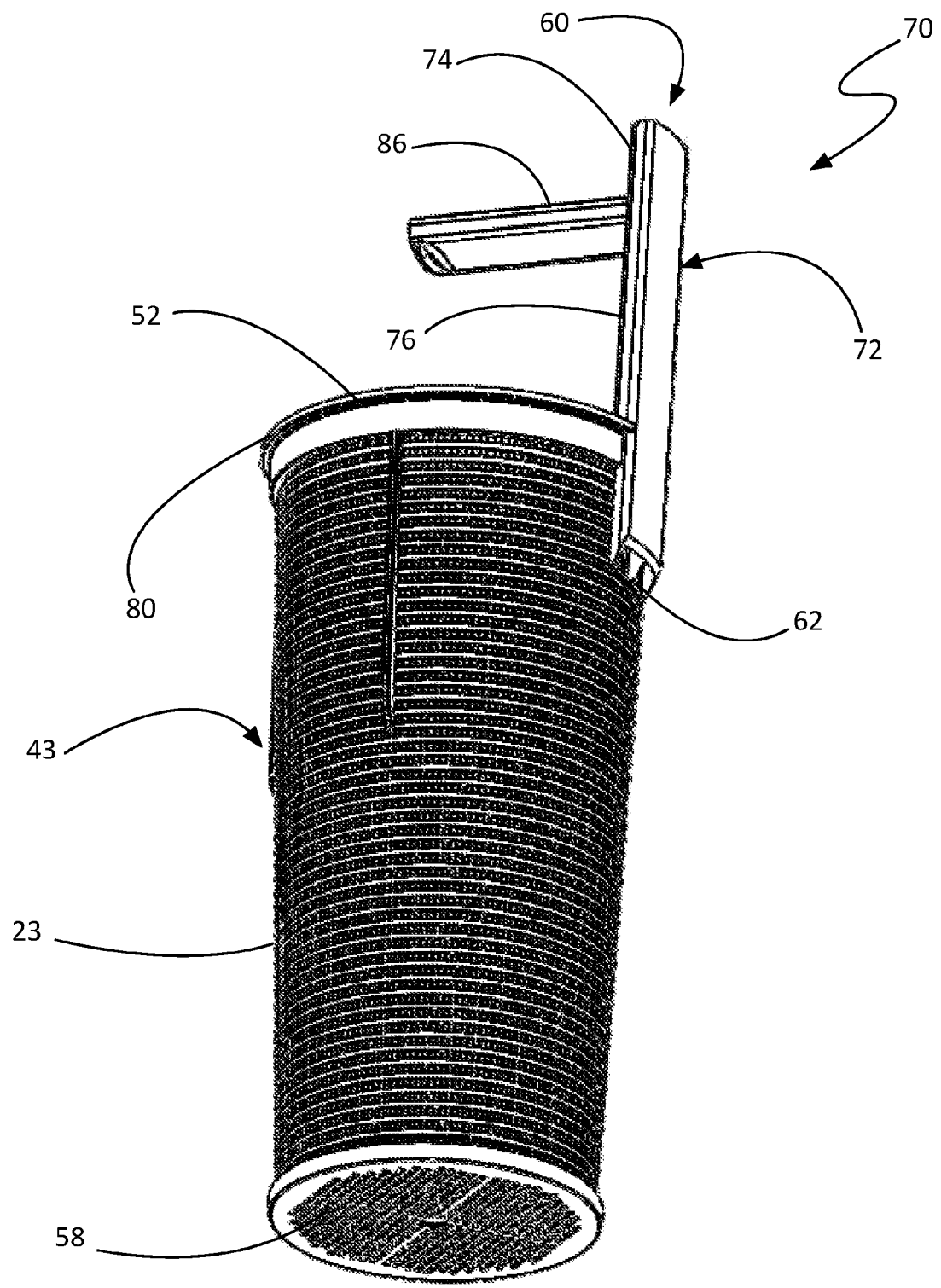
FIG. 8B. is an alternative perspective view of a variation of the skimmer basket of FIG. 7.

This disclosure further contemplates pool skimmer basket 70, according to various embodiments, to accomplish the same safety functions of previous embodiments. Pool skimmer basket 70 may be used in pool skimmer systems that include a venturi system 36 (e.g. pool skimmer system 6 of FIGS. 1 and 2, etc.), as well as pool skimmer systems without a venturi system 36 (e.g. pool skimmer system 6 of FIG. 9, etc.). Like the other pool skimmer baskets contemplated by this disclosure, pool skimmer basket 70 is advantageous over conventional skimmer baskets because, in combination with the configuration of the skimmer housing, an unimpeded fluid path 31 is formed between the air above the water level and the pump suction regardless of whether the skimmer basket is filled. While the fluid path 31 depicted in FIGS. 2 and 6 is between the porous walls 23 of a basket and the skimmer interior wall 4, the fluid path 31 formed with pool skimmer basket 70 first passes through a first conduit 72. FIGS. 7 and 8A depict perspective views of a non-limiting embodiment of a pool skimmer basket 70. FIG. 8B depicts a perspective view of a non-limiting embodiment of a pool skimmer basket 70 having a handle 86. FIG. 9 illustrates a cross-sectional view of a non-limiting embodiment of a pool skimmer basket 70 mounted within a pool skimmer housing. According to some aspects, a pool skimmer basket 70 is sized and shaped to fit within the pool skimmer housing, and may be either a conical or frusto-conical shape, or any other shape that fits within the pool skimmer housing.

Similar to conventional skimmer baskets and the pool skimmer baskets previously discussed, a pool skimmer basket 70 comprises an open top, a basket bottom 58, and one or more porous sidewalls 23. According to various embodiments, the pool skimmer basket 70 comprises a lower basket portion 43 extending between a basket rim 52 and the basket bottom 58, similar to the pool skimmer baskets depicted in previous figures. In the lower basket portion 43, one or more continuous porous sidewalls 23 typically extend entirely around the perimeter of the pool skimmer basket 70.

The embodiment of pool skimmer basket 70 shown in FIGS. 7-9 is cylindrical or frusto-conical in shape. In other embodiments, pool skimmer basket 70 may take on other shapes, such as an n-gonal prism, or other polyhedron. As with the cylindrical shaped baskets, these other shaped baskets may also be conical or fusto-conical in nature. The variety of pool skimmer basket shapes possible is true with any embodiment shown, described or contemplated in this disclosure and cylindrical or frusto-conically shaped pool skimmer baskets are only used for convenience of explanation.

In one or more embodiments, the pool skimmer basket 70 further comprises a first conduit 72. In the context of the present description, a conduit may be any channel through which a fluid (e.g. water, atmosphere, etc.) may be conveyed. As shown in FIGS. 7-9, the first conduit is straight; in other embodiments, the first conduit may be bent (e.g. the angle 78 between the upper segment 74 and the lower segment 76 may be something other than 180 degrees, etc.). Such a configuration may allow the first conduit 72 to be used as a handle above the normal pool water level, for improved ease of removal of the basket for periodic cleaning without submerging hands in debris-filled water as with prior art devices. According to some embodiments, including those depicted in FIGS. 7-9, the angle 78 is at least 90 degrees.

The first conduit 72 may have a variety of cross-sectional shapes; as a specific example, the cross-section of the first conduit 72 may be rectangular with rounded corners, according to one embodiment. In some embodiments, the first conduit 72 is an enclosed channel with open ends. In other embodiments, the first conduit 72 is a semi-enclosed channel with open ends. As a specific, non-limiting example, the first conduit 72 may be porous.

The first conduit 72 is adjacent to the basket rim 52. The first conduit 72 comprises an upper segment 74 with a fluid inlet 60 and a lower segment 76 with a fluid outlet 62. As shown in FIGS. 7-9, the lower segment 76 is approximately perpendicular to the basket bottom 58. In other embodiments, the lower segment 76 may not be perpendicular with respect to the basket bottom 58. The fluid inlet 60 and fluid outlet 62 are in fluid communication through the first conduit 72.

According to various embodiments, the upper segment 74 and the lower segment 76 of the first conduit 72 may comprise two separate and individual pieces coupled together (or coupled with one or more additional pieces), or a single piece integrally formed during manufacture. In some embodiments, the upper segment 74 and the lower segment 76 may be separable, to facilitate removal of any debris that may clog the first conduit 72.

In various embodiments, a portion of the first conduit 72 may be porous. For example, in one embodiment, a part 82 of the lower segment 76 of the first conduit 72 may also be a part 84 of the one or more porous sidewalls 23 of the lower basket portion 43. In this way, the first conduit 72 may continue to enable the formation of fluid path 31 without significantly reducing the functional surface area of porous sidewalls 23 of the lower basket portion 43. Furthermore, the fluid inlet 60 of the first conduit 72 is positioned above the basket rim 52, and within a perimeter 64 of the basket rim 52.

In some embodiments, including the embodiment depicted in FIG. 8B, a handle 86 may be coupled to the upper segment 74 of the first conduit 72, like a handle, to aid in the removal of the pool skimmer basket 70 from the skimmer housing for cleaning. The handle 86 may be hollow or solid. In other embodiments, the handle 86 may be coupled to the lower segment 76 of the first conduit 72.

One advantage that pool skimmer basket 70 provides over conventional skimmer baskets is that a fluid path 31 may be formed outside the skimmer basket such that if the skimmer basket gets clogged, the formation of a vacuum within the skimmer housing may be discouraged. This is possible because the fluid outlet 62 of the first conduit 72 is outside the porous sidewalls 23 of the lower basket portion 43, and below the basket rim 52, according to various embodiments. In some embodiments, the fluid outlet 62 may be located close to, or even below, the basket bottom 58. In other embodiments, including the non-limiting example shown in FIGS. 8 and 9, the fluid outlet 62 is located between the basket bottom 58 and the basket rim 52.

When mounted within the skimmer housing, the basket rim 52 prevents or inhibits pool water from entering the first basket opening 41 and the second basket opening 42 except through the porous walls 23 of the pool skimmer basket 70. The width of the skimmer throat 3 and a diameter of the pool skimmer basket 70 are ideally and generally equal or approximately equal. They may, however, comprise any dimensional combination.

The basket rim 52 of the pool skimmer basket 70 is configured to engage with the lower skimmer rim 30 when the pool skimmer basket 70 is mounted within the skimmer housing (shown in FIG. 9). The basket rim 52 may extend entirely around the perimeter of the pool skimmer basket 70. In various embodiments, the first conduit 72 may pass through the basket rim 52, such that the fluid outlet 62 is below the basket rim 52 and outside the porous sidewalls 23. In some embodiments, the first conduit 72 may be inside an outermost edge 80 of the basket rim 52, such that the basket rim 52 may interface with the lower skimmer rim 30 along the entire perimeter of the pool skimmer basket 70, thereby preventing or inhibiting pool water from entering. In other embodiments, the first conduit 72 may be flush with the outermost edge 80 of the basket rim 52, or even exceed it, to increase the volume of fluid which may form fluid path 31.

When positioned within the skimmer housing, the upper segment 74 of the first conduit 72 is positioned at an elevation that is at least halfway between the lower wall 18 and the upper wall 17 of the pool throat opening 3. More particularly, when positioned within the housing, the upper segment 74 of the first conduit 72 may be positioned at or above the water level.

As depicted in the non-limiting embodiment of FIG. 9, when a pool skimmer basket 70 is mounted within a pool skimmer housing, a fluid path 31 that extends between the one or more pump suction ports 16 and the fluid inlet 60 of the first conduit 72 is formed.

The fluid inlet 60 allows atmospheric or fluid communication with fluid path 31, even when the pool level is at the upper wall 17 of the pool throat opening 3. Thus, the fluid inlet 60 of the pool skimmer basket 70 is above the normal water level of the pool in one or more embodiments. The normal water level is usually maintained approximately midway between upper wall 17 and lower wall 18 of the pool throat opening 3. In this way, dangerous over suction is prevented by allowing atmosphere to enter the fluid inlet 60 that is positioned at least partially above the water level of the pool.

It would be understood by those skilled in the art that leaves and other debris being drawn into a pool throat opening 3 from the pool is trapped in the pool skimmer basket 70 and then generally drawn to an inner basket surface. Debris may continue to collect against the inner basket surface until the entire inner basket surface is covered, thus preventing water from flowing through the porous walls 23 and basket bottom 24 of the pool skimmer basket 70 and into the interior flow path. At this point, a vacuum would be created in the skimmer housing by the conventional pump suction port(s) 16 and/or a venturi system 36. The vacuum may be great enough to deform conventional baskets of the prior art. In the case of the pump suction being connected to conventional port(s) 16 and a venturi system 36, the flow would be reversed by the pump suction and would cause a dangerous suction condition at pool return port 21.

In contrast to conventional pool skimmer systems, it is apparent with the elements of embodiments of the skimmer that the above described over suction condition is significantly reduced, as air is allowed to enter the fluid inlet 60 of the first conduit 72 above the pool water level. The vacuum pressure in skimmer interior 4 is limited to the water depth between the pool return port 21 and the water level, which would normally not exceed 24 inches. As pump suction ports 16 or a venturi system 36 draw water from the skimmer housing interior upon activation of the pump suction, air will be drawn into pump suction ports 16 and/or a venturi system 36, thereby causing the suction pump (not shown) to draw in air and ultimately cease suction operation. When pump suction at a pump suction port 16 ceases, any reversing and the resultant dangerous suction at pool return port 21 will cease, or be limited to the approximate 24 inch water depth.

This disclosure also contemplates pool skimmer basket 90, according to various embodiments. Pool skimmer basket 90 may be used in pool skimmer systems that include a venturi system 36 (e.g. pool skimmer system 6 of FIGS. 1 and 2, etc.), as well as pool skimmer systems without a venturi system 36 (e.g. pool skimmer system 6 of FIG. 12., etc.). Like the other pool skimmer baskets contemplated by this disclosure, pool skimmer basket 90 is advantageous over conventional skimmer baskets because, in combination with the configuration of the skimmer housing, fluid paths 31 are formed. While the fluid paths 31 depicted in FIGS. 2 and 6 are between the porous walls 23 of a basket and the skimmer interior wall 4, the fluid paths 31 formed with pool skimmer basket 90 first pass through two or more conduits (e.g. the first conduit 72, one or more additional conduits 92, etc.). FIGS. 10 and 11 depict perspective views of a non-limiting embodiment of a pool skimmer basket 90. FIG. 12 depicts a cross-sectional view of a non-limiting embodiment of a pool skimmer basket 90 mounted within a pool skimmer housing. According to some aspects, a pool skimmer basket 90 is sized and shaped to fit within the pool skimmer housing, and may be either a conical or frusto-conical shape, or any other shape depending upon the shape and size of the pool skimmer housing and its respective opening.

Similar to conventional skimmer baskets and the pool skimmer baskets previously discussed, a pool skimmer basket 90 comprises an open top, a basket bottom 58, and one or more porous sidewalls 23. According to various embodiments, the pool skimmer basket 90 comprises a lower basket portion 43 extending between a basket rim 52 and the basket bottom 58, similar to the pool skimmer baskets depicted in previous figures. In the lower basket portion 43, one or more continuous porous sidewalls 23 typically extend entirely around the perimeter of the pool skimmer basket 90.

The embodiment of pool skimmer basket 90 shown in FIGS. 10-12 is cylindrical or frusto-conical in shape. In other embodiments, pool skimmer basket 90 may take on other shapes, such as an n-gonal prism, or other polyhedron. As with the cylindrical shaped baskets, these shapes may also be conical or fusto-conical. The variety of pool skimmer basket shapes possible is true with any embodiment shown, described or contemplated in this disclosure and cylindrical or frusto-conically shaped pool skimmer baskets are only used for convenience of explanation.

As shown in FIGS. 9-12, the pool skimmer basket 90 further comprises a first conduit 72, an additional conduit 92, and a handle 98. In other embodiments, the pool skimmer basket 90 may comprise a plurality of additional conduits 92. In the context of the present description, a conduit may be any channel through which a fluid (e.g. water, atmosphere, etc.) may be conveyed. The conduits (e.g. first conduit 72, additional conduit 92, etc.) may have a variety of cross-sectional shapes; as a specific example, the cross-section may be rectangular with rounded corners, according to one embodiment.

In some embodiments, the first conduit 72 and/or any additional conduits 92 may be channels enclosed on their sides with open ends. In other embodiments, each conduit may be a semi-enclosed channel with open ends. As a specific, non-limiting example, the conduits may be porous or otherwise include occasional openings along a lengths of the conduits.

The first conduit 72 and the additional conduits 92 are adjacent to the basket rim 52. Additionally, in some embodiments (such as those depicted in FIGS. 9-12), one or more of the conduits of pool skimmer basket 90 is approximately perpendicular to the basket bottom 58. In other embodiments, one or more of the conduits may be non-perpendicular with respect to the basket bottom 58.

In some embodiments, such as those depicted in FIGS. 9-12, the conduits (e.g. the first conduit 72, the additional conduits 92, etc.) are distributed symmetrically around the perimeter of the pool skimmer basket 90. In other embodiments, the distribution of the conduits of pool skimmer basket 90 about the perimeter of the basket rim 52 may be uneven.

As illustrated in the particular embodiment of FIGS. 9-12, each additional conduit 92 comprises a secondary fluid inlet 94 and a secondary fluid outlet 96. The secondary fluid inlet 94 and secondary fluid outlet 96 of each additional conduit 92 are in fluid communication through their respective additional conduit 92. Furthermore, the secondary fluid inlet 94 of each of the additional conduits 92 is positioned above the basket rim 52 and within the perimeter 64 of the basket rim 52. The secondary fluid outlet 96 of each of the additional conduits 92 is positioned below the basket rim 52 and above the basket bottom 58.

In various embodiments, including those illustrated in FIGS. 9-12, a portion of at least one of the conduits of pool skimmer basket 90 is porous. Specifically, a part 100 of an additional conduit 92 may also be a part 84 of the one or more porous sidewalls 23 of the lower basket portion 43. In this way, the conduit(s) may continue to enable the formation of fluid paths 31 without significantly reducing the functional surface area of porous sidewalls 23 of the lower basket portion 43.

FIGS. 9-12 depict embodiments of pool skimmer basket 90 which comprise two conduits (e.g. first conduit 72 and additional conduit 92, etc.). Other embodiments may comprise more than one additional conduits 92.

The pool skimmer basket 90 may also comprise a handle 98 above the normal pool water level, for improved ease of removal of the basket for periodic cleaning without submerging hands in debris-filled water, as with prior art devices. According to various embodiments, including those depicted in FIGS. 9-12, the handle 98 is coupled to the first conduit 72 and an additional conduit 92, and is above the basket rim 52. In some embodiments, the handle 98 may be able to at least partially rotate about an axis (e.g. the axis 102 of FIG. 11, etc.) that passes through one or more conduits (e.g. first conduit 72, additional conduits 92, etc.) of pool skimmer basket 90.

One advantage that pool skimmer basket 90 provides over conventional skimmer baskets is that fluid paths 31 may be formed outside the skimmer basket such that if the skimmer basket gets clogged, the likelihood that a vacuum will be formed within the skimmer housing is significantly reduced. This is possible because the fluid outlet 62 of first conduit 72 and the secondary fluid outlets 96 of one or more additional conduits 92 are outside the porous sidewalls 23 of the lower basket portion 43, and below the basket rim 52, according to various embodiments. In some embodiments, the secondary fluid outlets 96 may be located close to, or even below, the basket bottom 58. In other embodiments, the secondary fluid outlets 96 may be located between the basket bottom 58 and the basket rim 52.

When mounted within the skimmer housing, the basket rim 52 prevents or inhibits pool water from entering the first basket opening 41 and the second basket opening 42 except through the porous walls 23 of the pool skimmer basket 90. The width of the skimmer throat 3 and a diameter of the pool skimmer basket 90 are ideally and generally equal or approximately equal. They may, however, comprise any dimensional combination.

The basket rim 52 of the pool skimmer basket 90 is configured to engage with the lower skimmer rim 30 when the pool skimmer basket 90 is mounted within the skimmer housing (shown in FIG. 12). The basket rim 52 may extend entirely around the perimeter of the pool skimmer basket 90. In various embodiments, the conduits of pool skimmer basket 90 may pass through the basket rim 52, such that the fluid outlet 62 of first conduit 72 and the secondary fluid outlets 96 of one or more additional conduits 92 are below the basket rim 52 and outside the porous sidewalls 23. In some embodiments, one or more of the conduits of pool skimmer basket 90 may be inside an outermost edge 80 of the basket rim 52, such that the basket rim 52 may interface with the lower skimmer rim 30 along the perimeter of the basket rim 52, thereby preventing or inhibiting pool water from entering. In other embodiments, the conduits of pool skimmer basket 90 may be flush with the outermost edge 80 of the basket rim, or even exceed it, to increase the volume of fluid that may form fluid paths 31.

When positioned within the skimmer housing, the fluid inlet 60 of the first conduit 72 and the secondary fluid inlet 94 of each additional conduit 92 is positioned at an elevation that is at least halfway between the lower wall 18 and the upper wall 17 of the pool throat opening 3. More particularly, when positioned within the housing, the fluid inlets of each conduit of pool skimmer basket 90 may be positioned at or above the water level.

As depicted in the non-limiting embodiment of FIG. 12, when a pool skimmer basket 90 is mounted within a pool skimmer housing, fluid paths 31 that extend between the one or more pump suction ports 16 and the upper opening 94 of each of the conduits (e.g. first conduit 72, additional conduits 92, etc.) of pool skimmer basket 90 are formed. As FIG. 12 is a cross-sectional view, only one of the fluid paths 31 is shown. The secondary fluid inlet 94 allows atmospheric or fluid communication with fluid path 31, even when the pool level is at the upper wall 17 of the pool throat opening 3. Thus, the secondary fluid inlets 94 and the fluid inlet 60 of the pool skimmer basket 90 are above the normal water level of the pool in one or more embodiments. The normal water level is usually maintained approximately midway between upper wall 17 and lower wall 18 of the pool throat opening 3. In this way, dangerous over suction is reduced by allowing atmosphere to enter the fluid inlets that are positioned at least partially above the water level of the pool.

It would be understood by those skilled in the art that leaves and other debris being drawn into a pool throat opening 3 from the pool is trapped in the pool skimmer basket 90 and then generally drawn to an inner basket surface. Debris may continue to collect against the inner basket surface until the entire inner basket surface is covered, thus preventing or inhibiting water from flowing through the porous walls 23 and basket bottom 24 of the pool skimmer basket 90 and into the interior flow path. At this point, a vacuum would be created in the skimmer housing by the conventional pump suction port(s) 16 and/or a venturi system 36. The vacuum may be great enough to deform conventional baskets of the prior art. In the case of the pump suction being connected to conventional port(s) 16 and a venturi system 36, the flow would be reversed by pump suction and would cause a dangerous suction condition at pool return port 21.

In contrast to conventional pool skimmer systems, it is apparent with the elements of embodiments of the skimmer that the above described over suction condition is significantly reduced as air is allowed to enter the fluid inlets (e.g. fluid inlet 60, secondary fluid inlets 94, etc.) of the conduits above the pool water level. The vacuum pressure in the skimmer interior 4 is limited to the water depth between the pool return port 21 and the water level, which would normally not exceed 24 inches. As pump suction ports 16 or a venturi system 36 draw water from the skimmer housing interior upon activation of the pump suction, air will be drawn into pump suction ports 16 and/or a venturi system 36, thereby causing the suction pump (not shown) to draw in air and ultimately cease suction operation. When pump suction at a pump suction port 16 ceases, any reversing and the resultant dangerous suction at pool return port 21 will cease, or be limited to the approximate 24 inch water depth.

It is evident that the current invention overcomes disadvantages by eliminating external tubing and allowing for easier maintenance. It is also apparent that if any of the pool skimmer baskets contemplated by this disclosure are not installed, the skimmer would employ the same safety features as described. It is apparent that the upper skimmer housing 12 and lower skimmer housing 11 could be adapted to fit only the pool skimmer baskets contemplated by the current disclosure, to prevent unapproved baskets from being used.

It will be understood that implementations are not limited to the specific components disclosed herein, as virtually any components consistent with the intended operation of a method and/or system implementation for a pool skimmer system may be utilized. Accordingly, for example, although particular housings, baskets, ports, pumps, and the like may be disclosed, such components may comprise any shape, size, style, type, model, version, class, grade, measurement, concentration, material, weight, quantity, and/or the like consistent with the intended operation of a method and/or system implementation for a pool skimmer system may be used.

In places where the description above refers to particular implementations of a pool skimmer system, it should be readily apparent that a number of modifications may be made without departing from the spirit thereof and that these implementations may be applied to other pool skimmer systems. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A pool skimmer basket, comprising:
   a basket rim comprising a lower basket rim, an upper basket rim, and two basket side rims extending between the upper basket rim and the lower basket rim, wherein the lower basket rim and upper basket rim are non-planar with respect to each other and are non-planar with respect to the two basket side rims;
   a basket bottom opposite the basket rim;
   a lower basket portion comprising one or more continuous porous sidewalls positioned between the basket rim and the basket bottom;
   a fluid inlet above at least a first part of the basket rim and within a perimeter of the basket rim; and
   a fluid outlet below at least a second part of the basket rim and above the basket bottom,
   wherein the fluid inlet and the fluid outlet are in fluid communication.

2. The pool skimmer basket of claim 1, further comprising:
   an upper basket portion,
   wherein the first part of the basket rim is the lower basket rim,
   wherein the second part of the basket rim is the upper basket rim,
   wherein the upper basket portion comprises a porous sidewall extending between the lower basket rim and the upper basket rim and a pool inlet opening extending between the lower basket rim and the upper basket rim,
   wherein the two basket side rims are positioned adjacent two terminating ends of the porous sidewall of the upper basket portion,
   wherein the fluid inlet is an interior surface of the porous sidewall of the upper basket portion,
   wherein the fluid outlet is an exterior surface of the porous sidewall of the upper basket portion, and
   wherein the fluid inlet and the fluid outlet are in fluid communication through the porous sidewall of the upper basket portion.

3. The pool skimmer basket of claim 2, further comprising a handle adjacent the upper basket rim.

4. The pool skimmer basket of claim 2, further comprising:
   an upper rim opening for each of the two basket side rims, the upper rim opening extending through the upper basket rim;
   a lower rim opening for each of the two basket side rims, the lower rim opening extending through the lower basket rim;
   wherein the two basket side rims are conduits extending through a majority of the two basket side rims, respectively, and
   wherein, for each of the two basket side rims, the lower rim opening and the upper rim opening are in fluid communication through the basket side rim.

5. The pool skimmer basket of claim 2, wherein the lower basket rim is adjacent the pool inlet opening and extends only between the two basket side rims.

6. The pool skimmer basket of claim 2, further comprising:
   one or more air slots extending through the upper basket rim,
   wherein the one or more air slots are positioned on the upper basket rim adjacent the porous sidewall of the upper basket portion.

7. The pool skimmer basket of claim 2, further comprising:
   one or more air slots extending through the lower basket rim,
   wherein the lower basket rim extends around the entire pool skimmer basket, and
   wherein the one or more air slots are positioned on the lower basket rim adjacent the porous sidewall of the upper basket portion.

8. The pool skimmer basket of claim 1, further comprising:
   a first conduit adjacent to the basket rim, comprising an upper segment and a lower segment,
   wherein the upper segment of the first conduit comprises the fluid inlet,
   wherein the lower segment of the first conduit comprises the fluid outlet,
   wherein the fluid outlet is outside the one or more continuous porous sidewalls, and
   wherein the fluid inlet and the fluid outlet are in fluid communication through the first conduit.

9. The pool skimmer basket of claim 8:
   wherein the first conduit passes through the basket rim, and
   wherein the first conduit is flush with an outermost edge of the basket rim.

10. The pool skimmer basket of claim 8:
    wherein the first conduit passes through the basket rim, and wherein the first conduit is inside an outermost edge of the basket rim.

11. The pool skimmer basket of claim 8, further comprising a handle coupled to the upper segment of the first conduit.

12. The pool skimmer basket of claim 1, further comprising:
a first conduit and at least one additional conduits or passages, all adjacent to the basket rim; and
a handle coupled to the first conduit and one or more of the at least one additional conduits or passages,
wherein the first conduit comprises the fluid inlet and the fluid outlet,
wherein each of the at least one additional conduits or passages comprises a secondary fluid inlet and a secondary fluid outlet,
wherein, for each of the at least one additional conduits or passages, the secondary fluid inlet is above the basket rim and within the perimeter of the basket rim,
wherein, for each of the at least one additional conduits or passages, the secondary fluid outlet is below the basket rim and above the basket bottom,
wherein the fluid inlet and the fluid outlet are in fluid communication through the first conduit,
wherein, for each of the at least one additional conduits or passages, the secondary fluid inlet and the secondary fluid outlet are in fluid communication through their respective additional conduit or passage, and
wherein the fluid outlet and the secondary fluid outlet of each of the at least one additional conduits or passages are outside the one or more continuous porous sidewalls.

13. A pool skimmer basket, comprising:
a basket rim;
a first conduit passing through the basket rim and comprising an upper segment comprising a fluid inlet and a lower segment comprising a fluid outlet, wherein the fluid inlet and the fluid outlet are in fluid communication through the first conduit;
a basket bottom opposite the basket rim;
a lower basket portion comprising one or more continuous porous sidewalls positioned between the basket rim and the basket bottom;
wherein the fluid inlet is above at least a first part of the basket rim and within a perimeter of the basket rim, and wherein the fluid outlet is below at least a second part of the basket rim and above the basket bottom outside the one or more continuous porous sidewalls.

14. The pool skimmer basket of claim 13, wherein the first conduit is flush with an outermost edge of the basket rim.

15. The pool skimmer basket of claim 13, wherein the first conduit is inside an outermost edge of the basket rim.

16. The pool skimmer basket of claim 13, wherein at least a part of the lower segment of the first conduit is also a part of the one or more continuous porous sidewalls.

17. The pool skimmer basket of claim 13, further comprising a handle coupled to the upper segment of the first conduit.

18. The pool skimmer basket of claim 13, wherein the upper segment of the first conduit forms an angle with the lower segment of at least 90 degrees.

19. The pool skimmer basket of claim 13, wherein at least a part of the first conduit is also a part of the one or more continuous porous sidewalls.

20. The pool skimmer basket of claim 13, further comprising:
at least one additional conduit adjacent to the basket rim and comprising a second fluid inlet above the basket rim and within a perimeter of the basket rim, and a second fluid outlet below the basket rim, above the basket bottom and outside the one or more continuous porous sidewalls, wherein the second fluid inlet and second fluid outlet are in fluid communication with each other through the at least one additional conduit; and
a handle coupled to the first conduit and to the at least one additional conduit.

21. The pool skimmer basket of claim 20, wherein the first conduit and one or more of the at least one additional conduits are porous.

22. The pool skimmer basket of claim 20, wherein the handle is able to at least partially rotate about an axis that passes through the first conduit and the at least one additional conduit.

* * * * *